(12) United States Patent
Alhooshani et al.

(10) Patent No.: US 11,504,699 B2
(45) Date of Patent: Nov. 22, 2022

(54) PREPARATION OF MESOPOROUS SILICA SUPPORTED NIMOS CATALYSTS FOR HYDRODESULFURIZATION APPLICATION

(71) Applicant: King Fahd University of Petroleum and Minerals, Dhahran (SA)

(72) Inventors: Khalid R. Alhooshani, Dhahran (SA); Saheed Adewale Ganiyu, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/454,849

(22) Filed: Jun. 27, 2019

(65) Prior Publication Data
US 2022/0152598 A1 May 19, 2022

(51) Int. Cl.
*B01J 27/00* (2006.01)
*B01J 27/051* (2006.01)
(Continued)

(52) U.S. Cl.
CPC .......... *B01J 27/0515* (2013.01); *B01J 21/08* (2013.01); *B01J 35/1019* (2013.01); *B01J 35/1042* (2013.01); *B01J 35/1061* (2013.01); *B01J 37/0018* (2013.01); *B01J 37/0205* (2013.01); *B01J 37/0236* (2013.01); *B01J 37/04* (2013.01);
(Continued)

(58) Field of Classification Search
CPC .... B01J 27/0515; B01J 21/08; B01J 35/1019; B01J 35/1042; B01J 35/1061; B01J 37/0018; B01J 37/0205; B01J 37/0236; B01J 37/04; B01J 37/10; B01J 37/18; B01J 37/20; C10G 2400/04
See application file for complete search history.

(56) References Cited

U.S. PATENT DOCUMENTS

| 4,048,060 A | 9/1977 | Riley |
| 9,523,046 B2 | 12/2016 | Gatt et al. |

(Continued)

FOREIGN PATENT DOCUMENTS

| CN | 102423712 B | 7/2013 |
| CN | 104707629 A | 6/2015 |
| CN | 106622308 A | 5/2017 |

OTHER PUBLICATIONS

Valencia, et al. ; Effect of the support composition on the characteristics of NiMo and CoMo/(Zr)SBA-15 catalysts and their performance in deep hydrodesulfurization ; Catalysis Today, vol. 166, Issue 1 ; pp. 91-101 ; May 30, 2011 ; Abstract Only ; 2 Pages.
(Continued)

*Primary Examiner* — Prem C Singh
*Assistant Examiner* — Brandi M Doyle
(74) *Attorney, Agent, or Firm* — Oblon, McClelland, Maier & Neustadt, L.L.P.

(57) ABSTRACT

A method of making a hydrodesulfurization catalyst having nickel and molybdenum sulfides deposited on a support material containing mesoporous silica that is optionally modified with zirconium. The method of making the hydrodesulfurization catalyst involves a single-step calcination and reduction procedure. The utilization of the hydrodesulfurization catalyst in treating a hydrocarbon feedstock containing sulfur compounds (e.g. dibenzothiophene, 4,6-dimethyldibenzothiophene) to produce a desulfurized hydrocarbon stream is also provided.

20 Claims, 7 Drawing Sheets

(51) Int. Cl.
    B01J 37/00    (2006.01)
    B01J 37/04    (2006.01)
    B01J 37/10    (2006.01)
    B01J 37/18    (2006.01)
    B01J 37/20    (2006.01)
    B01J 35/10    (2006.01)
    B01J 21/08    (2006.01)
    B01J 37/02    (2006.01)
    C10G 45/08    (2006.01)

(52) U.S. Cl.
    CPC .............. *B01J 37/10* (2013.01); *B01J 37/18* (2013.01); *B01J 37/20* (2013.01); *C10G 45/08* (2013.01); *C10G 2300/1055* (2013.01); *C10G 2300/70* (2013.01); *C10G 2400/04* (2013.01)

(56) References Cited

U.S. PATENT DOCUMENTS

| | | |
|---|---|---|
| 2015/0182952 A1 | 7/2015 | Alvarez Contreras et al. |
| 2018/0100107 A1 | 4/2018 | Alhooshani et al. |
| 2018/0187094 A1 | 7/2018 | Sunkara et al. |
| 2019/0039052 A1 | 2/2019 | Bergwerff et al. |

OTHER PUBLICATIONS

Soriano, et al.; Behavior of NiMo(W)/Zr-SBA-15 deep hydrodesulfurization catalysts in presence of aromatic and nitrogen-containing compounds; Studies in Surface Science and Catalysis, vol. 175; pp. 525-528; 2010; Abstract Only; 1 Page.

Jalilov, et al.; Kinetic and Mechanistic Analysis of Dibenzothiophene Hydrodesulfurization on Ti-SBA-15-NiMo Catalysts; Energy Fuels, 32(11); pp. 11383-11389; Sep. 28, 2018; Abstract Only; 1 Page.

Xu, et al.; Highly efficient NiMo/$SiO_2$—$Al_2O_3$ hydrodesulfurization catalystprepared from gemini surfactant-dispersed Mo precursor; Applied Catalysis B: Environmental 203; pp. 839-850; Oct. 29, 2016; 12 Pages.

Gutiérrez-Alejandre, et al.; On the role of triethylene glycol in the preparation of highly active Ni-Mo/$Al_2O_3$ hydrodesulfurization catalysts:As pectroscopic study; Applied Catalysis B: Environmental; pp. 160-167; Nov. 25, 2014; 8 Pages.

Díaz-García, et al.; Electronic binding of sulfur sites into $Al_2O_3$—$ZrO_2$ supports for NiMoSconfiguration and their application for Hydrodesulfurization; Catalysis Today 282; pp. 230-239; Aug. 24, 2016; 10 Pages.

PREPARATION OF MESOPOROUS SILICA SUPPORTED NIMOS CATALYSTS FOR HYDRODESULFURIZATION APPLICATION

STATEMENT OF ACKNOWLEDGEMENT

The inventors acknowledge the support provided by King Fahd University of Petroleum and Minerals (KFUPM) under the project number DSR NUS15105.

BACKGROUND OF THE INVENTION

Technical Field

The present disclosure relates to a method of making hydrodesulfurization catalysts containing nickel and molybdenum sulfides supported by mesoporous silica, and a process of hydrodesulfurization using these catalysts.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The most important source of energy is fossil fuel [M. S. Dresselhaus, I. L. Thomas, Alternative energy technologies, Nature, 414 (2001) 332-337; and S. Shafiee, E. Topal, When will fossil fuel reserves be diminished?, Energy policy, 37 (2009) 181-189]. Crude fossil fuel is refined into light oil such as gasoline and to heavy oil such as jet fuel [B. E. Firth, S. E. Kirk, Methods of refining natural oils, and methods of producing fuel compositions, US patent application publication No.: 2013/0006012 A1; J. Han, G. S. Forman, A. Elgowainy, H. Cai, M. Wang, V. B. DiVita, A comparative assessment of resource efficiency in petroleum refining, Fuel, 157 (2015) 292-298; and Y. Shen, X. Xu, P. Li, A novel potential adsorbent for ultra-deep desulfurization of jet fuels at room temperature, RSC Advances, 2 (2012) 6155-6160]. The main source of the exhaust pollutants is the sulfur present in crude oil. The majority of refined oil is used in vehicle combustion engines [F. Liu, Q. Cai, S. Chen, W. Zhou, A comparison of the energy consumption and carbon emissions for different modes of transportation in open-cut coal mines, International Journal of Mining Science and Technology, 25 (2015) 261-266] and there is need to ensure that the exhaust is less detrimental to the environment. To achieve this, the fuel must have very low sulfur content. High concentration of sulfur generates sulfur oxides during combustion which are poisonous to engines and the environment [C. Song, Fuel processing for low-temperature and high-temperature fuel cells: Challenges, and opportunities for sustainable development in the 21st century, Catalysis today, 77 (2002) 17-49; and M. Muzic, K. Sertic-Bionda, Z. Gomzi, Kinetic and statistical studies of adsorptive desulfurization of diesel fuel on commercial activated carbons, Chemical Engineering & Technology, 31 (2008) 355-364]. Furthermore, the oxides react with atmospheric moisture and form acid rain that is harmful to vegetation, aquatic, animal and human life [G. Bao-Zhu, L. I. U. Ying, C. Huan-Sheng, P. A. N. Xiao-Le, W. Zi-Fa, Spatial source contributions identification of acid rain over the Yangtze River Delta using a variety of methods, Atmospheric and Oceanic Science Letters, 8 (2015) 397-402; J. Q. Koenig, 22 Sulfur Dioxide Exposure in Humans, Toxicology of the Nose and Upper Airways, (2016) 334; and S. Hosseinkhani Hezave, M. Askary, F. Amini, M. Zahedi, Influence of Air $SO_2$ Pollution on Antioxidant Systems of Alfalfa Inoculated with Rhizobium, Journal of Genetic Resources, 1 (2015) 7-18]. Sulfur poisoning of the metal catalyst in the three-way catalytic system (catalytic converter) during octane rating and corrosion of pipes, pumps and other industrial equipment during the refining processes is of major concern [V. C. Srivastava, An evaluation of desulfurization technologies for sulfur removal from liquid fuels, Rsc Advances, 2 (2012) 759-783; S. Velu, X. Ma, C. Song, M. Namazian, S. Sethuraman, G. Venkataraman, Desulfurization of JP-8 jet fuel by selective adsorption over a Ni-based adsorbent for micro solid oxide fuel cells, Energy & Fuels, 19 (2005) 1116-1125; and T. Fukunaga, H. Katsuno, H. Matsumoto, O. Takahashi, Y. Akai, Development of kerosene fuel processing system for PEFC, Catalysis Today, 84 (2003) 197-200]. Therefore, desulfurization of crude oil is an important economic and environmental concern of petroleum industries.

The sulfur content threshold in transportation fuels is currently set at 10 ppm by US and EU regulation bodies. To prevent poisoning of anode catalyst, fuels with essentially no sulfur content are required for fuel cell applications [C. Song, An overview of new approaches to deep desulfurization for ultra-clean gasoline, diesel fuel and jet fuel, Catalysis today, 86 (2003) 211-263].

Hydrodesulfurization (HDS) is an industrially applicable desulfurization approach to reduce sulfur concentration in crude oil feed. Recent research efforts in HDS have been focused on deep desulfurization of crude oil, especially for desulfurization of refractory sulfur compounds in transportation fuels. However, there is a need to improve the catalytic performance of HDS catalysts including more effective dispersion of active species. Different strategies to disperse active phases for enhanced catalytic performance have been reported. These strategies include modifying the catalyst support via utilization of complexing agents, incorporation of heteroatoms (e.g. Zr, Ti, Al, Nb) or organic functional groups, and replacement of current impregnation method with other synthesis approaches [M. Sun, D. Nicosia, R. Prins, The effects of fluorine, phosphate and chelating agents on hydrotreating catalysts and catalysis, Catalysis Today, 86 (2003) 173-189; S. Badoga, A. K. Dalai, J. Adjaye, Y. Hu, Combined effects of EDTA and heteroatoms (Ti, Zr, and Al) on catalytic activity of SBA-15 supported NiMo catalyst for hydrotreating of heavy gas oil, Industrial & Engineering Chemistry Research, 53 (2014) 2137-2156; J. Escobar, M. C. Barrera, J. A. Toledo, M. A. Cortés-Jácome, C. Angeles-Chavez, S. Núñez, V. Santes, E. Gómez, L. Diaz, E. Romero, Effect of ethyleneglycol addition on the properties of P-doped $NiMo/Al_2O_3$ HDS catalysts: Part I. Materials preparation and characterization, Applied Catalysis B: Environmental, 88 (2009) 564-575; and S. A. Ganiyu, K. Alhooshani, S. A. Ali, Single-pot synthesis of Ti-SBA-15-NiMo hydrodesulfurization catalysts: Role of calcination temperature on dispersion and activity, Applied Catalysis B: Environmental, 203 (2017) 428-441, each incorporated herein by reference in their entirety].

A catalyst support is a critical component because it can influence the catalytic functionalities of the active metal component through dispersion and/or metal-support interactions [G. M. Dhar, B. N. Srinivas, M. S. Rana, M. Kumar, S. K. Maity, Mixed oxide supported hydrodesulfurization catalysts—a review, Catalysis Today, 86 (2003) 45-60; M. S. Rana, S. K. Maity, J. Ancheyta, G. M. Dhar, T. S. R. P. Rao, $MoCo(Ni)/ZrO_2$—$SiO_2$ hydrotreating catalysts: physico-chemical characterization and activities studies, Applied Catalysis A: General, 268 (2004) 89-97; and M. Breysse, J. L. Portefaix, M. Vrinat, Support effects on hydrotreating catalysts, Catalysis today, 10 (1991) 489-505]. Despite high catalytic activities, unsupported catalysts such as NEBULA are becoming less popular for industrial applications due to toxicity and expense of hydroprocessing operations [S. A. Ganiyu, K. Alhooshani, S. A. Ali, Single-pot synthesis of Ti-SBA-15-NiMo hydrodesulfurization catalysts: Role of calcination temperature on dispersion and activity, Applied Catalysis B: Environmental, 203 (2017) 428-441]. Catalyst supports containing oxides such as silica [F. E. Massoth, G. Muralidhar, J. Shabtai, Catalytic functionalities of supported sulfides: II. Effect of support on Mo dispersion, Journal of Catalysis, 85 (1984) 53-62, incorporated herein by reference in its entirety], alumina [T. Isoda, S. Nagao, X. Ma, Y. Korai, I. Mochida, Hydrodesulfurization pathway of 4, 6-dimethyldibenzothiophene through isomerization over Y-zeolite containing CoMo/$Al_2O_3$ catalyst, Energy & fuels, 10 (1996) 1078-1082, incorporated herein by reference in its entirety], titania [S. Inoue, A. Muto, H. Kudou, T. Ono, Preparation of novel titania support by applying the multi-gelation method for ultra-deep HDS of diesel oil, Applied Catalysis A: General, 269 (2004) 7-12, incorporated herein by reference in its entirety], magnesium oxide [K. V. R. Chary, H. Ramakrishna, K. S. R. Rao, G. M. Dhar, P. K. Rao, Hydrodesulfurization on $MoS_2$/MgO, Catalysis letters, 10 (1991) 27-33, incorporated herein by reference in its entirety], zirconium oxide [P. Afanasiev, M. Cattenot, C. Geantet, N. Matsubayashi, K. Sato, S. Shimada, (Ni)W/$ZrO_2$ hydrotreating catalysts prepared in molten salts, Applied Catalysis A: General, 237 (2002) 227-237, incorporated herein by reference in its entirety], and mixed oxides [S. Damyanova, L. Petrov, M. A. Centeno, P. Grange, Characterization of molybdenum hydrodesulfurization catalysts supported on $ZrO_2$—$Al_2O_3$ and $ZrO_2$—$SiO_2$ carriers, Applied Catalysis A: General, 224 (2002) 271-284; and M. P. Borque, A. Lopez-Agudo, E. Olgum, M. Vrinat, L. Cedeno, J. Ramírez, Catalytic activities of Co (Ni) Mo/$TiO_2$—$Al_2O_3$ catalysts in gasoil and thiophene HDS and pyridine HDN: Effect of the $TiO_2$—$Al_2O_3$ composition, Applied Catalysis A: General, 180 (1999) 53-61, each incorporated herein by reference in their entirety] have been reported.

γ-$Al_2O_3$ has been widely applied as a support material for hydrotreating catalysts because of its good mechanical and morphological properties, more effective dispersion of active metals, as well as low cost. However, strong metal-support interactions (SMSI) are observed between γ-$Al_2O_3$ and many active metals including Mo and Ni [O. Y. Gutiérrez, F. Perez, G. A. Fuentes, X. Bokhimi, T. Klimova, Deep HDS over NiMo/Zr-SBA-15 catalysts with varying $MoO_3$ loading, Catalysis Today, 130 (2008) 292-301, incorporated herein by reference in its entirety]. Commercial sulfide Co(Ni)Mo(W)/alumina catalysts lack the capacity to achieve deep HDS of fuel feedstocks, therefore alternative HDS catalysts that are stable and catalytically efficient are needed.

In view of the forgoing, one objective of the present invention is to provide a method of producing a hydrodesulfurization catalyst having nickel and molybdenum sulfides supported by mesoporous silica that is optionally modified by zirconium. Another objective of the present disclosure is to provide a process of desulfurizing a hydrocarbon feedstock catalyzed by the hydrodesulfurization catalyst.

BRIEF SUMMARY OF THE INVENTION

According to a first aspect, the present disclosure relates to a method of producing a NiMoS hydrodesulfurization catalyst containing nickel sulfide and molybdenum sulfide disposed on a support material comprising a mesoporous silica. The method involves the steps of i) mixing a silica source and an aqueous solution comprising a structural directing surfactant, an acid, and a molybdenum precursor to form a first mixture, ii) hydrothermally treating the first mixture to form a first dried mass, iii) mixing a solution comprising a nickel precursor and the first dried mass to form a second mixture, iv) drying the second mixture to form a second dried mass, v) calcining the second dried mass in an atmosphere comprising a reducing agent to form a calcined and reduced catalyst, and vi) sulfiding the calcined and reduced catalyst with a sulfide-containing solution thereby forming the NiMoS hydrodesulfurization catalyst, wherein the first dried mass is not calcined.

In one embodiment, the first mixture further comprises a zirconium source, and the support material comprises a zirconium modified mesoporous silica.

In one embodiment, the calcining is performed at a temperature of 300-600° C. for 0.5-8 hours.

In one embodiment, the sulfiding is performed at a temperature of 250-500° C. for 1-10 hours.

In one embodiment, the reducing agent is present in an amount of 5-20% by volume relative to a total volume of the atmosphere.

In one embodiment, the reducing agent is $H_2$.

In one embodiment, the sulfide-containing solution comprises $CS_2$.

In one embodiment, the silica source is tetraethoxysilane, and the structural directing surfactant is P123.

In one embodiment, the mesoporous silica is SBA-15.

In one embodiment, the zirconium source is zirconium (IV) isopropoxide.

In one embodiment, the NiMoS hydrodesulfurization catalyst has a Mo content in a range of 8-20% by weight and a Ni content in a range of 1-6% by weight, each relative to a total weight of the NiMoS hydrodesulfurization catalyst.

In one embodiment, the support material has a Si:Zr weight ratio of 5:1 to 20:1.

In one embodiment, the NiMoS hydrodesulfurization catalyst has a BET surface area of 350-450 $m^2$/g.

In one embodiment, the NiMoS hydrodesulfurization catalyst has a total pore volume of 0.52-0.8 $cm^3$/g, and an average pore size of 4-7 nm.

According to a second aspect, the present disclosure relates to a method for desulfurizing a hydrocarbon feedstock comprising a sulfur-containing compound. The method involves the steps of contacting the hydrocarbon feedstock with a NiMoS hydrodesulfurization catalyst in the presence of $H_2$ gas to convert at least a portion of the sulfur-containing compound into a mixture of $H_2S$ and a desulfurized product, and removing $H_2S$ from the mixture thereby forming a desulfurized hydrocarbon stream, wherein i) the NiMoS hydrodesulfurization catalyst contains nickel sulfide and molybdenum sulfide disposed on a support material comprising a zirconium modified mesoporous silica with a Si:Zr weight ratio of 5:1 to 20:1, ii) the NiMoS hydrodesulfurization catalyst has a Mo content in a range of 8-20% by weight and a Ni content in a range of 1-6% by weight, each relative to a total weight of the NiMoS hydrodesulfurization catalyst, and iii) the NiMoS hydrodesulfurization catalyst has a BET surface area of 350-450 $m^2$/g, a total pore volume of 0.52-0.8 $cm^3$/g, and an average pore size of 4-7 nm.

In one embodiment, the hydrocarbon feedstock is contacted with the NiMoS hydrodesulfurization catalyst at a temperature of 200-500° C. and a pressure of 2-10 MPa for 0.1-10 hours.

In one embodiment, the sulfur-containing compound is present in the hydrocarbon feedstock at a concentration of 0.01-10% by weight relative to a total weight of the hydrocarbon feedstock.

In one embodiment, the sulfur-containing compound is at least one selected from the group consisting of a sulfide, a disulfide, a thiophene, a benzothiophene, and a dibenzothiophene.

In one embodiment, the sulfur-containing compound is dibenzothiophene, 4,6-dimethyldibenzothiophene, or both.

In one embodiment, the sulfur content of the desulfurized hydrocarbon stream is 50-99% by weight less than that of the hydrocarbon feedstock.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
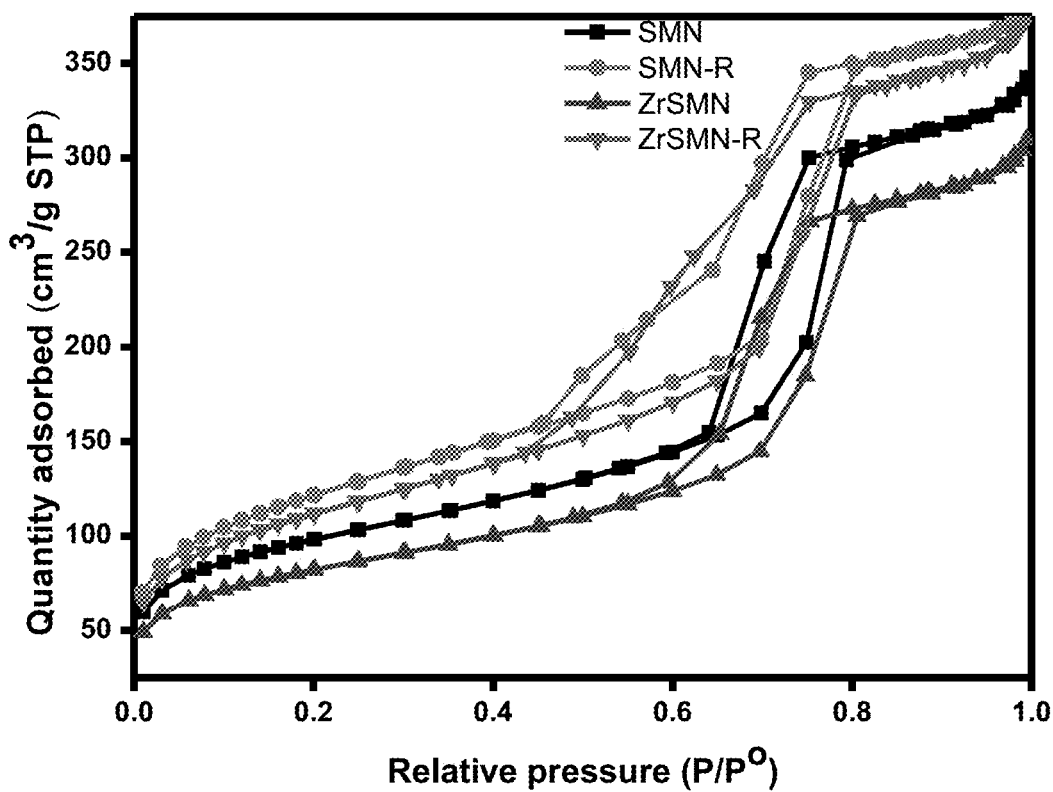
FIG. 1A is an overlay of $N_2$ physisorption isotherms of NiMoS catalysts SMN, ZrSMN, SMN-R, and ZrSMN-R, respectively (refer to Example 2 for the abbreviation key).
Figure 1B:
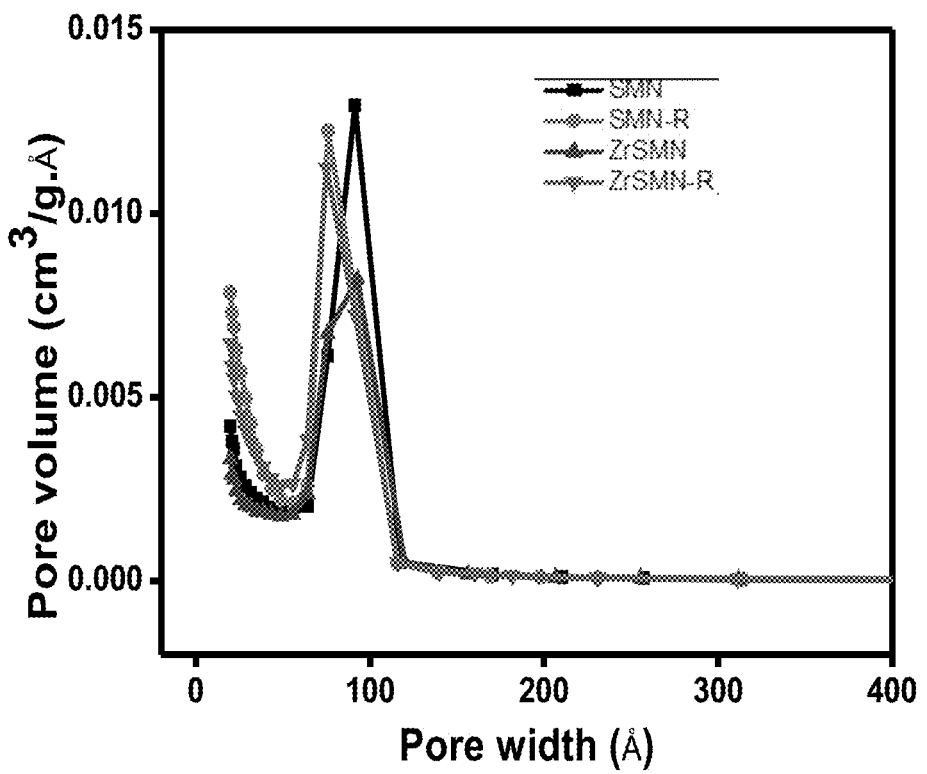
FIG. 1B is a graph showing pore size distributions of NiMoS catalysts SMN, ZrSMN, SMN-R, and ZrSMN-R, respectively.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, "compound" and "precursor" are intended to refer to a chemical entity, whether as a solid, liquid, or gas, and whether in a crude mixture or isolated and purified.

The present disclosure includes all hydration states of a given salt or formula, unless otherwise noted. For example, nickel(II) acetate includes anhydrous $Ni(OCOCH_3)_2$, tetrahydrate $Ni(OCOCH_3)_2.4H_2O$, and any other hydrated forms or mixtures. Ammonium heptamolybdate(VI) includes anhydrous $(NH_4)_6Mo_7O_{24}$, and hydrated forms such as ammonium heptamolybdate tetrahydrate $(NH_4)_6Mo_7O_{24}.4H_2O$.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{12}C$, $^{13}C$, and $^{14}C$, isotopes of oxygen include $^{16}O$, $^{17}O$, and $^{18}O$, isotopes of nickel include $^{58}Ni$, $^{60-62}Ni$, and $^{64}Ni$, and isotopes of molybdenum include $^{92}Mo$, $^{94-98}Mo$, and $^{100}Mo$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

A first aspect of the present disclosure relates to a method of producing a NiMoS hydrodesulfurization catalyst containing nickel sulfide and molybdenum sulfide disposed on a support material comprising a mesoporous silica. The method involves the steps of i) mixing a silica source and an aqueous solution comprising a structural directing surfactant, an acid, and a molybdenum precursor to form a first mixture, ii) hydrothermally treating the first mixture to form a first dried mass, iii) mixing a solution comprising a nickel precursor and the first dried mass to form a second mixture, iv) drying the second mixture to form a second dried mass, v) calcining the second dried mass in an atmosphere comprising a reducing agent to form a calcined and reduced catalyst, and vi) sulfiding the calcined and reduced catalyst with a sulfide-containing solution thereby forming the NiMoS hydrodesulfurization catalyst, wherein the first dried mass is not calcined.

In one or more embodiments, the silica source is a tetraalkyl orthosilicate. Exemplary tetraalkyl orthosilicates include, but are not limited to, tetraethyl orthosilicate, tetramethyl orthosilicate, tetrapropyl orthosilicate, and tetrabutyl orthosilicate. In a preferred embodiment, the silica source is tetraethyl orthosilicate (TEOS).

In one or more embodiments, the structural directing surfactant is a nonionic block copolymer. A block copolymer is a type of copolymer made up of blocks of different polymerized monomers. In a block copolymer, a portion of the macromolecule comprising many constitutional units has at least one feature which is not present in the adjacent portions. Block copolymers comprise two or more homopolymer and/or homooligomer subunits linked by covalent bonds. The union of the homopolymer subunits may require an intermediate non-repeating subunit, known as a junction block. Block copolymers with two or three distinct blocks are called diblock copolymers and triblock copolymers respectively, tetrablocks, and multiblocks, etc. may also be fabricated. In stereoblock copolymers, a special structure may be formed from one monomer where the distinguishing feature is the tacticity of each block. The structural directing surfactant may be a block copolymer, a stereoblock copolymer, or mixtures thereof.

In one embodiment, the structural directing surfactant is a poloxamer. Poloxamers are nonionic triblock copolymers composed of a central hydrophobic chain of polyoxypropylene (poly(propylene oxide), or PPO) flanked by two hydrophilic chains of polyoxyethylene (poly(ethylene oxide), or PEO). Because the lengths of the polymer blocks may be customized, many different poloxamers that have slightly different properties exist. For the generic term poloxamer, these copolymers are commonly named with the letter P (for poloxamer) followed by three digits: the first two digits multiplied by 100 give the approximate molecular mass of the polyoxypropylene core in g/mol, and the last digit multiplied by 10 gives the percentage polyoxyethylene content. In one embodiment, the structural directing surfactant is P123 poloxamer (i.e. P123), which is a symmetric triblock copolymer comprising poly(ethylene oxide) (PEO) and poly(propylene oxide) (PPO) in an alternating linear fashion, PEO-PPO-PEO. The unique characteristic of PPO block, which is hydrophobic at temperatures above 288 K and is soluble in water at temperatures below 288 K, leads to the formation of micelles comprising PEO-PPO-PEO triblock copolymers. The nominal chemical formula of P123 is $HO(CH_2CH_2O)_{20}(CH_2CH(CH_3)O)_{70}(CH_2CH_2O)_{20}H$, which corresponds to a molecular weight of around 5,800 g/mol. P123 poloxamer may be known by the trade name Pluronic® P-123.

In one or more embodiment, the molybdenum precursor is a Mo(VI) salt. Exemplary Mo(VI) salts include, but are not limited to, ammonium heptamolybdate(VI), ammonium heptamolybdate(VI) tetrahydrate, ammonium molybdate (VI), ammonium phosphomolybdate, ammonium tetrathiomolybdate, sodium molybdate(VI), lithium molybdate(VI), molybdenum(VI) dichloride dioxide, and mixtures thereof. In certain embodiments, a molybdenum salt having a different oxidation state, such as +2 (e.g. molybdenum(II) carboxylates), +3 (e.g. molybdenum(III) chloride), +4 (e.g. molybdenum(IV) carbonate), and +5 (e.g. molybdenum(V) chloride), may be used in addition to or in lieu of the Mo(VI) salt. Alternatively, a molybdenum acid, a molybdenum base may be used in addition to or in lieu of the Mo(VI) salt. In a preferred embodiment, the molybdenum precursor used herein is ammonium heptamolybdate(VI) tetrahydrate.

The silica source, the structural directing surfactant, and the molybdenum precursor may be mixed with an aqueous solution comprising an acid to form a first mixture. The acid may be hydrochloric acid, formic acid, benzoic acid, acetic acid, phosphoric acid, hydrobromic acid, hydroiodic acid, nitric acid, hydrofluoric acid, sulfuric acid, and/or perchloric acid or some other acid. In a preferred embodiment, the acid is hydrochloric acid, nitric acid, hydrofluoric acid, sulfuric acid, and/or perchloric acid. Most preferably the acid is hydrochloric acid (HCl). The aqueous solution may comprise 3-15 wt %, preferably 5-10 wt %, more preferably 6-8 wt % of the acid relative to the total weight of the aqueous solution, with the remaining weight percentage comprising water, preferably deionized or distilled water.

In one or more embodiments, the first mixture further comprises a zirconium source. Suitable zirconium sources include, but are not limited to, zirconium(IV) isopropoxide, zirconium(IV) propoxide, zirconium(IV) ethoxide, zirconium(IV) acetate hydroxide, zirconium(IV) 2-ethylhexanoate, zirconium(IV) butoxide, zirconium(IV) tert-butoxide, zirconium(IV) dibutoxide(bis-2,4-pentanedionate), and mixtures thereof. In a preferred embodiment, the zirconium source is zirconium(IV) isopropoxide. Most preferably, the zirconium (IV) isopropoxide is a 1-propanol solution of zirconium(IV) isopropoxide which contains about 70 wt. % of zirconium (IV) isopropoxide relative to a total weight of the solution.

Prior to the mixing step, the silica source, the structural directing surfactant, the acid, and optionally the zirconium source may be combined in a solvent comprising water to form a siliceous mixture, which is stirred for 2-36 hours, preferably 5-30 hours, preferably 10-20 hours, or about 16 hours, and then mixed with the molybdenum precursor for 0.5-8 hours, preferably 1-6 hours, preferably 2-5 hours, or about 3 hours to form the first mixture. In an alternative embodiment, the aforementioned reagents (i.e. the silica source, the structural directing surfactant, the acid, the molybdenum precursor, and optionally the zirconium source) are mixed in a solvent comprising water for 2-44 hours, 5-36 hours, or 10-20 hours to form the first mixture.

Mixings may occur via stirring, shaking, swirling, sonicating, blending, or by otherwise agitating a mixture. In one embodiment, the mixture is stirred by a magnetic stirrer or an overhead stirrer. In another embodiment, the mixture is left to stand (i.e. not stirred). Alternatively, the mixture is subjected to ultrasonication. The ultrasonication may be performed using an ultrasonic bath or an ultrasonic probe.

The first mixture may comprise the aqueous solution at a weight percentage of 80-97 wt %, preferably 85-95 wt %, more preferably 88-92 wt % relative to a total weight of the first mixture. The first mixture may comprise the structural directing surfactant at a weight percentage of 0.5-5 wt %, preferably 1-4 wt %, more preferably 2-3 wt % relative to a total weight of the first mixture. The silica source and the zirconium source may have a combined weight that is 4-11 wt %, preferably 6-9 wt %, more preferably 7-9 wt % of the total weight of the first mixture. More specifically, the silica source may be present in the first mixture at a weight percentage of 3-10 wt %, preferably 4-8 wt %, more preferably 5-7 wt % relative to a total weight of the first mixture. The first mixture may have a Si:Zr weight ratio of 5:1 to 20:1, preferably 7:1 to 15:1, more preferably 9:1 to 12:1, or about 10:1. In at least one embodiment, the first mixture is devoid of a nickel precursor. In a related embodiment, the nickel precursor is added to a mixture containing a first dried mass described hereinafter (i.e. after hydrothermal treatment of the first mixture).

The first mixture may be hydrothermally treated to form a first dried mass. In one embodiment, the first mixture is hydrothermally treated via heating in an autoclave at 50-120° C., preferably 60-110° C., more preferably 70-100° C., or about 80° C. for 6-48 hours, preferably 12-36 hours, more preferably 18-24 hours to produce a first mass comprising mesoporous silica and/or zirconium modified mesoporous silica if the zirconium source is present in the first mixture.

An external heat source, such as an oven, a heating mantle, a water bath, or an oil bath, may be employed to dry mixtures (e.g. first mass, second mass) of the present disclosure. Alternatively, mixtures of the present disclosure may be air dried. The first mass may be dried, for instance, in an oven at a temperature of 80-120° C., preferably 85-110° C., more preferably 90-105° C., or about 100° C. for 3-36 hours, preferably 6-24 hours, or about 12 hours to form a first dried mass. In one embodiment, the first mass is dried via heating in air. Alternatively, the first mass is dried in oxygen-enriched air, an inert gas, or a vacuum. In preferred embodiments, the first mass is dried at a temperature below 250° C., preferably at a temperature below 200° C., more preferably at a temperature below 150° C.

The first dried mass may be mixed with a solution comprising a nickel precursor thereby forming a second mixture. The nickel precursor may be a Ni(II) salt. Exemplary suitable Ni(II) salts include, but are not limited to, nickel(II) acetate, nickel(II) acetate tetrahydrate, nickel(II) acetylacetonate, nickel(II) hexafluoroacetylacetonate, nickel (II) octanoate, ammonium nickel(II) sulfate, nickel(II) chloride, nickel(II) bromide, nickel(II) fluoride, nickel(II) iodide, nickel(II) carbonate, nickel(II) hydroxide, nickel(II) nitrate, nickel(II) nitrate hexahydrate, nickel(II) perchlorate, nickel(II) sulfate, nickel(II) sulfamate, and mixtures thereof. In certain embodiments, a nickel salt having a different oxidation state, such as +1, +3, +4, may be used in addition to or in lieu of the Ni(II) salt. In a preferred embodiment, the nickel precursor used herein in nickel(II) nitrate hexahydrate.

The first dried mass and the nickel precursor may be mixed in the presence of a solvent, preferably water, an alcohol such as methanol and ethanol, or a mixture thereof to form a second mixture. In one embodiment, the second mixture may have a Mo:Ni weight ratio of 2:1 to 9:1, preferably 3:1 to 7:1, more preferably 4:1 to 5:1, or about 13:3.

The second mixture may be dried at a temperature of 40-90° C., preferably 50-80° C., more preferably 60-70° C. for 3-15 hours, preferably 6-12 hours, preferably 8-10 hours to form a second dried mass. In preferred embodiments, the second mixture is dried at a temperature below 250° C., preferably at a temperature below 200° C., more preferably at a temperature below 150° C. In one embodiment, the second mixture is dried via heating in air. Alternatively, the second mixture is dried in oxygen-enriched air, an inert gas, or a vacuum.

The second dried mass may be calcined in an atmosphere containing a reducing agent to form a calcined and reduced catalyst, thus a reduction step occurs simultaneously with the calcination step of the present disclosure. Performing the calcination and reduction procedures on the second dried mass in a single step (i.e. single-step calcination and reduction) may eliminate the number of separation and purification steps, reducing operation time, improving product yield, and lowering preparation cost.

In one embodiment, the reducing agent present in the atmosphere is hydrogen gas ($H_2$), carbon monoxide (CO), and/or ammonia gas. In a preferred embodiment, the reducing agent is $H_2$. The atmosphere may contain 5-20%, preferably 8-18%, more preferably 10-15% by volume of the reducing agent (e.g. $H_2$) diluted in nitrogen, helium, and/or argon relative to a total volume of the atmosphere. The atmosphere containing the reducing agent (e.g. $H_2$ gas) may stay stagnant over the second dried mass. Alternatively, the atmosphere containing the reducing agent (e.g. $H_2$ gas) is passed through the second dried mass. In one embodiment, the atmosphere containing the reducing agent (e.g. $H_2$ gas) is passed through the second dried mass at a flow rate of 20-500 mL/min, 40-250 mL/min, 80-150 mL/min, or about 100 mL/min.

Preferably, the second dried mass is calcined in the atmosphere containing $H_2$ gas at a temperature in a range of 300-600° C., preferably 325-500° C., preferably 350-450° C., or about 400° C. for 0.5-8 hours, preferably 1-6 hours, preferably 2-4 hours, or about 3 hours to form a calcined and reduced catalyst. Calcination can be carried out within shaft furnaces, rotary kilns, multiple hearth furnaces, and/or fluidized bed reactors. It is worth noting that the previously mentioned first dried mass is not calcined (i.e. being heated at a temperature of 300° C. or above).

The calcined and reduced catalyst may be sulfided with a sulfide-containing solution, thereby forming the NiMoS hydrodesulfurization catalyst. Preferably, the calcined and reduced catalyst is sulfided with a sulfide-containing solution at a temperature in a range of 250-500° C., preferably 300-450° C., or about 350° C. for 1-10 hours, 2-8 hours, 3-6 hours, or about 4 hours. The sulfide-containing solution used herein may include carbon disulfide ($CS_2$), and may further include dimethyl disulfide, ethylene sulfide, trimethylene sulfide, propylene sulfide, and bis(methylthio)methane. This sulfiding step may convert active catalyst materials in oxide form to their corresponding sulfide form, which may be catalytically more active than the oxide form.

Since the discovery of M41S by Mobil scientists in 1992, mesoporous molecular sieves with large surface area, good mechanical property and thermal stability, and ordered pore structures have attracted much attention [C. T. Kresge, M. E. Leonowicz, W. J. Roth, J. C. Vartuli, J. S. Beck, Ordered mesoporous molecular sieves synthesized by a liquid-crystal template mechanism, nature, 359 (1992) 710-712; and J. S. Beck, J. C. Vartuli, W. J. Roth, M. E. Leonowicz, C. T. Kresge, K. D. Schmitt, C. T. W. Chu, D. H. Olson, E. W. Sheppard, S. B. McCullen, A new family of mesoporous molecular sieves prepared with liquid crystal templates, Journal of the American Chemical Society, 114 (1992) 10834-10843]. These mesoporous materials have been adopted for different applications including separation, adsorption, sensing, and catalysis [W.-H. Zhang, J. Lu, B. Han, M. Li, J. Xiu, P. Ying, C. Li, Direct synthesis and characterization of titanium-substituted mesoporous molecular sieve SBA-15, Chemistry of Materials, 14 (2002) 3413-3421; A. M. Liu, K. Hidajat, S. Kawi, D. Y. Zhao, A new class of hybrid mesoporous materials with functionalized organic monolayers for selective adsorption of heavy metal ions, Chemical Communications, (2000) 1145-1146; and S. J. Bae, S.-W. Kim, T. Hyeon, B. M. Kim, New chiral heterogeneous catalysts based on mesoporous silica: asymmetric diethylzinc addition to benzaldehyde, Chemical Communications, (2000) 31-32, each incorporated herein by reference in their entirety]. In recent years, mesoporous materials with a large surface area such as MCM-41, KIT-6, FDU, HMS, and SBA-15 have been explored as support for hydrotreating catalysts [A. Wang, Y. Wang, T. Kabe, Y. Chen, A. Ishihara, W. Qian, Hydrodesulfurization of dibenzothiophene over siliceous MCM-41-supported catalysts: I. Sulfided Co—Mo catalysts, Journal of Catalysis, 199 (2001) 19-29; T. A. Zepeda, T. Halachev, B. Pawelec, R. Nava, T. Klimova, G. A. Fuentes, J. L. G. Fierro, Hydrodesulfurization of dibenzothiophene over CoMo/HMS and CoMo/Ti-HMS catalysts, Catalysis Communications, 7 (2006) 33-41; and G. M. Dhar, G. M. Kumaran, M. Kumar, K. S. Rawat, L. D. Sharma, B. D. Raju, K. S. R. Rao, Physico-chemical characterization and catalysis on SBA-15 supported molybdenum hydrotreating catalysts, Catalysis Today, 99 (2005) 309-314, each incorporated herein by reference in their entirety]. Current studies on viability of SBA-15 as catalyst support for NiMo hydrotreating catalyst for hydrodesulfurization of model fuel have shown promising results.

Compared to the strong interaction between alumina and active metal species, the metal-support interaction between mesoporous silica support and metal species is relatively weak. As a result, modification on the silica support may be necessary to achieve a sufficient interaction and maintain desirable physical and morphological properties. Complexing agents, phosphide additives, and heteroatom elements have been employed to explore highly dispersed HDS catalysts for ultra-deep desulfurization [M. Sun, D. Nicosia, R. Prins, The effects of fluorine, phosphate and chelating agents on hydrotreating catalysts and catalysis, Catalysis Today, 86 (2003) 173-189; and P. Rayo, J. Ramirez, M. S. Rana, J. Ancheyta, A. Aguilar-Elguézabal, Effect of the incorporation of Al, Ti, and Zr on the cracking and hydrodesulfurization activity of NiMo/SBA-15 catalysts, Industrial & Engineering Chemistry Research, 48 (2008) 1242-1248, each incorporated herein by reference in their entirety].

In one or more embodiments, the NiMoS hydrodesulfurization catalyst prepared by the method of the first aspect has nickel sulfide and molybdenum sulfide disposed on a support material. In a preferred embodiment, the support material comprises a mesoporous silica. A "mesoporous support" refers to a porous support material with largest pore diameters ranging from about 2-50 nm, preferably 3-45 nm, preferably 4-40 nm, preferably 5-25 nm. As used herein, "mesoporous silica" refers to a mesoporous support comprising silica ($SiO_2$). Non-limiting examples of mesoporous silica include MCM-48, MCM-41, MCM-18, SBA-11, SBA-12, SBA-15, and SBA-16. In a preferred embodiment, the mesoporous silica is SBA-15.

Recently, the effect of incorporating heteroatoms such as Ti, Zr, and Al into the framework of the SBA-15 has been studied [L. Y. Lizama, T. E. Klimova, SBA-15 modified with Al, Ti, or Zr as supports for highly active NiW catalysts for HDS, Journal of materials science, 44 (2009) 6617, incorporated herein by reference in its entirety]. The heteroatoms, which are Lewis acids, can provide acid sites and increase metal-support interactions. Several approaches for incorporation of the heteroatoms into SBA-15 have also been studied [P. Rayo, J. Ramírez, M. S. Rana, J. Ancheyta, A. Aguilar-Elguézabal, Effect of the incorporation of Al, Ti, and Zr on the cracking and hydrodesulfurization activity of NiMo/SBA-15 catalysts, Industrial & Engineering Chemistry Research, 48 (2008) 1242-1248; P. Biswas, P. Narayanasarma, C. M. Kotikalapudi, A. K. Dalai, J. Adjaye, Characterization and activity of $ZrO_2$ doped SBA-15 supported NiMo catalysts for HDS and HDN of bitumen derived heavy gas oil, Industrial & Engineering Chemistry Research, 50 (2011) 7882-7895; and O. Y. Gutiérrez, G. A. Fuentes, C. Salcedo, T. Klimova, SBA-15 supports modified by Ti and Zr grafting for NiMo hydrodesulfurization catalysts, Catalysis Today, 116 (2006) 485-497, each incorporated herein by reference in their entirety]. Recently, Ganiyu et al. reported a single-pot procedure to prepare catalysts having NiMo supported on titanium-modified mesoporous SBA-15 [S. A. Ganiyu, K. Alhooshani, S. A. Ali, Single-pot synthesis of Ti-SBA-15-NiMo hydrodesulfurization catalysts: Role of calcination temperature on dispersion and activity, Applied Catalysis B: Environmental, 203 (2017) 428-441, incorporated herein by reference in its entirety]. These catalysts demonstrated greater catalytic activity than those prepared by the conventional co-impregnation approach. This single-pot procedure offered a pragmatic approach for achieving efficient catalyst performance at low cost.

Zr-based SBA-15 NiMo and CoMo HDS catalysts have been developed using various synthesis methods [O. Y. Gutiérrez, F. Perez, G. A. Fuentes, X. Bokhimi, T. Klimova, Deep HDS over NiMo/Zr-SBA-15 catalysts with varying $MoO_3$ loading, Catalysis Today, 130 (2008) 292-301; P. Biswas, P. Narayanasarma, C. M. Kotikalapudi, A. K. Dalai, J. Adjaye, Characterization and activity of $ZrO_2$ doped SBA-15 supported NiMo catalysts for HDS and HDN of bitumen derived heavy gas oil, Industrial & Engineering Chemistry Research, 50 (2011) 7882-7895; O. Y. Gutiérrez, G. A. Fuentes, C. Salcedo, T. Klimova, SBA-15 supports modified by Ti and Zr grafting for NiMo hydrodesulfurization catalysts, Catalysis Today, 116 (2006) 485-497; and S. Garg, K. Soni, G. M. Kumaran, M. Kumar, J. K. Gupta, L. D. Sharma, G. M. Dhar, Effect of Zr-SBA-15 support on catalytic functionalities of Mo, CoMo, NiMo hydrotreating catalysts, Catalysis Today, 130 (2008) 302-308, each incorporated herein by reference in their entirety]. Zr can be incorporated into mesoporous SBA-15 silica support by grafting, direct or post synthesis method, followed by impregnation of Ni(Co)Mo active species. However, these approaches require multiple and repetitive steps of drying and calcination before reduction of metal oxide(s) to active form.

In a preferred embodiment, the support material of the NiMoS hydrodesulfurization catalyst comprises a zirconium modified mesoporous silica, which is achieved by adding the zirconium source to the first mixture as previously described. Preferably, zirconium is present in the NiMoS hydrodesulfurization catalyst in oxide forms (e.g. $ZrO_2$). The support material comprising the zirconium modified mesoporous silica may have a Si:Zr weight ratio of 5:1 to 20:1, preferably 7:1 to 15:1, more preferably 9:1 to 12:1, or about 10:1.

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, pore size (i. e. pore diameter), total pore volume, and BET surface area are measured by gas adsorption analysis, preferably $N_2$ adsorption analysis (e.g. $N_2$ adsorption isotherms).

In one embodiment, the support material is mesoporous and has pore channels that are regularly arranged. For example, the mesoporous support material is in the form of a honeycomb-like structure having pore channels parallel or substantially parallel to each other within a two-dimensional hexagon (e.g. SBA-15). Alternatively, other mesoporous silica structures of the SBA series such as SBA-11 having a cubic structure, SBA-12 having a three-dimensional hexagonal structure, and SBA-16 having a cubic in cage-like structure may be used as the mesoporous support material. In one embodiment, the mesoporous support material is in the form of SBA-15, and the mesoporous support material has a pore volume of 0.6-1.5 $cm^3/g$, 0.7-1.2 $cm^3/g$, or 0.8-1.0 $cm^3/g$, and a BET surface area of 400-900 $m^2/g$, 450-800 $m^2/g$, or 500-600 $m^2/g$.

An average diameter (e.g., average particle size) of the particle, as used herein, and unless otherwise specifically noted, refers to the average linear distance measured from one point on the particle through the center of the particle to a point directly across from it. For a circle, an oval, an ellipse, and a multilobe, the term "diameter" refers to the greatest possible distance measured from one point on the shape through the center of the shape to a point directly across from it. For polygonal shapes, the term "diameter", as used herein, and unless otherwise specified, refers to the greatest possible distance measured from a vertex of a polygon through the center of the face to the vertex on the opposite side. The support material used herein may be in the form of particles (e.g. mesoporous silica particles, zirconium modified mesoporous silica particles). In one embodiment, the support material is in the form of particles having an average particle size of 0.01-5 μm, 0.05-4 μm, 0.1-3 μm, 0.2-2, or 0.4-1 μm.

As used herein, "disposed on" describes catalytic materials being deposited on or impregnated in a support material such that the support material is completely or partially filled throughout, saturated, permeated, and/or infused with the catalytic materials. The catalytic materials (i.e. nickel and molybdenum sulfides) may be affixed to support material (e.g. mesoporous silica, zirconium modified mesoporous silica) in any reasonable manner, such as physisorption, chemisorption, or mixtures thereof. In a related embodiment, the NiMoS hydrodesulfurization catalyst of the present disclosure may have both nickel and molybdenum sulfides decorated on the surface of the support material (e.g. mesoporous silica, zirconium modified mesoporous silica). In another related embodiment, the NiMoS hydrodesulfurization catalyst may have both nickel and molybdenum sulfides disposed on the surface and impregnated in the support material.

In preferred embodiments, the nickel and molybdenum sulfides are homogeneously distributed throughout the support material. The nickel and molybdenum species and their distributions on the support material may be identified by techniques including, but not limited to, UV-vis spectroscopy, XRD, Raman spectroscopy, AFM (atomic force microscope), TEM (transmission electron microscopy), and EPR (electron paramagnetic resonance). In one embodiment, greater than 10% of the surface area (i.e. surface and pore spaces) of the support material (e.g. mesoporous silica, zirconium modified mesoporous silica) is covered by the nickel and molybdenum sulfides, preferably greater than 15%, preferably greater than 20%, preferably greater than 25%, preferably greater than 30%, preferably greater than 35%, preferably greater than 40%, preferably greater than 45%, preferably greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99% of the support material is covered by the nickel and molybdenum sulfides.

In one or more embodiments, the NiMoS hydrodesulfurization catalyst disclosed herein has a Mo content in a range of 8-20%, preferably 9-18%, preferably 10-16%, preferably 11-15%, preferably 12-14%, or about 13% by weight relative to a total weight of the NiMoS hydrodesulfurization catalyst. However, in certain embodiments, the NiMoS hydrodesulfurization catalyst has a Mo content that is less than 8% or greater than 20% by weight relative to a total weight of the NiMoS hydrodesulfurization catalyst. Preferably, molybdenum is present in the NiMoS hydrodesulfurization catalyst in sulfide forms (e.g. $MoS_2$, $MoS_3$). However, in certain embodiments, molybdenum may be present in other species such as metallic molybdenum and oxide forms (e.g. $MoO_2$, $MoO_3$) in the NiMoS hydrodesulfurization catalyst in addition to, or in lieu of molybdenum sulfides.

In one or more embodiments, the NiMoS hydrodesulfurization catalyst has a Ni content in a range of 0.8-8%, preferably 1-6%, preferably 1.5-5%, preferably 2-4%, preferably 2.5-3.5%, or about 3% by weight relative to a total weight of the NiMoS hydrodesulfurization catalyst. However, in certain embodiments, the NiMoS hydrodesulfurization catalyst has a Ni content that is less than 0.8% or greater than 8% by weight relative to a total weight of the NiMoS hydrodesulfurization catalyst. In a related embodiment, the NiMoS hydrodesulfurization catalyst has a Mo:Ni weight ratio of 2:1 to 9:1, preferably 3:1 to 7:1, more preferably 4:1 to 5:1, or about 13:3. In certain embodiments, the NiMoS hydrodesulfurization catalyst has a Mo:Ni weight ratio that is less than 2:1 or greater than 9:1. Preferably, nickel is present in the NiMoS hydrodesulfurization catalyst in sulfide forms (e.g. NiS, $Ni_2S_3$). However, in certain embodiments, nickel may be present in other species such as metallic nickel and oxide forms (e.g. NiO, $Ni_2O_3$) in the NiMoS hydrodesulfurization catalyst in addition to, or in lieu of nickel sulfides.

The NiMoS hydrodesulfurization catalyst may be in the form of particles with an average diameter in a range of 0.1-10 μm, 0.5-5 μm, 1-4 μm, or 2-3 μm. In a preferred embodiment, the NiMoS hydrodesulfurization catalyst particles are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In a preferred embodiment, the catalyst particles are monodisperse having a particle size distribution ranging from 80% of the average particle size (e.g. diameter) to 120% of the average particle size, preferably 85-115%, preferably 90-110% of the average particle size. In another embodiment, the catalyst particles are not monodisperse.

The NiMoS hydrodesulfurization catalyst particles may be agglomerated or non-agglomerated (i.e., the particles are well separated from one another and do not form clusters). In some embodiments, the NiMoS hydrodesulfurization catalyst particles may cluster and form agglomerates having an average diameter in a range of 2-25 μm, 4-15 μm, or 5-10 μm.

In one or more embodiments, the NiMoS hydrodesulfurization catalyst has a BET surface area of 350-500 $m^2/g$, preferably 370-480 $m^2/g$, preferably 390-460 $m^2/g$, preferably 400-450 $m^2/g$, preferably 410-440 $m^2/g$, preferably 420-430 $m^2/g$. In one embodiment, when SBA-15 is used as the support material, the catalyst has a BET surface area of 400-500 $m^2/g$, 410-450 $m^2/g$, 420-440 $m^2/g$, or about 425 $m^2/g$. In another embodiment, when zirconium modified SBA-15 is used as the support material, the catalyst has a BET surface area of 350-410 $m^2/g$, 370-400 $m^2/g$, 380-395 $m^2/g$, or about 390 $m^2/g$.

Preferably, the NiMoS hydrodesulfurization catalyst is mesoporous. In a related embodiment, the NiMoS hydrodesulfurization catalyst has an average pore size of 3-7 nm, 4-6.5 nm, 4.5-6 nm, or 5-5.5 nm. In one embodiment, when SBA-15 is used as the support material, the catalyst has an average pore size of 3-6.3 nm, 5-6.2 nm, or about 6.1 nm. In another embodiment, when zirconium modified SBA-15 is used as the support material, the catalyst has an average pore size of 4.5-7 nm, 5-6.5 nm, or about 6.4 nm. In another related embodiment, the Ni/Mo hydrodesulfurization catalyst has a total pore volume of 0.52-0.9 $cm^3/g$, 0.54-0.8 $cm^3/g$, 0.56-0.7 $cm^3/g$, or 0.58-0.68 $cm^3/g$.

In one or more embodiments, the NiMoS hydrodesulfurization catalyst of the present disclosure has a BET surface area that is 10-50% greater, preferably 15-40% greater, more preferably 20-30% greater than a substantially similar catalyst not formed by the above-described method involving a single-step calcination and reduction (i.e. single-step calcination and reduction method). Here, the substantially similar catalyst not formed by the single-step calcination and reduction method refers to a catalyst having nickel and molybdenum sulfides each present in relative weight percentages substantially similar to those in the currently disclosed catalyst, which are prepared via a process involving two or more calcination steps performed at a temperature at 300° C. or above (e.g. catalysts prepared by method (1) described in Example 2).

In a related embodiment, the NiMoS hydrodesulfurization catalyst of the present disclosure has an average pore size that is 8-30% smaller, preferably 10-20% smaller, more preferably 12-15% smaller than a substantially similar catalyst not formed by the single-step calcination and reduction method. In another related embodiment, the NiMoS hydrodesulfurization catalyst of the present disclosure has a total pore volume that is 10-40% greater, preferably 15-30% greater, more preferably 20-25% greater than a substantially similar catalyst not formed by the single-step calcination and reduction method.

The NiMoS hydrodesulfurization catalyst of the present disclosure may preferably be rod-like, spherical, or substantially spherical (e.g., oval or oblong shape). In other embodiments, the NiMoS hydrodesulfurization catalyst can be of any shape that provides desired catalytic activity and stability of the NiMoS hydrodesulfurization catalyst. For example, the NiMoS hydrodesulfurization catalyst may be in a form of at least one shape such as a sphere, a rod, a disc, and a platelet. In at least one embodiment, the NiMoS hydrodesulfurization catalyst of the present disclosure is devoid of cubical sheet-shaped particles, which are found in the aforementioned substantially similar catalyst not formed by the single-step calcination and reduction method (see FIGS. 7A-D).

The catalytic activity of many sulfides/oxides in various processes is due to their Lewis and/or Bronsted acidities. A number of techniques have been developed for the characterization of acid-base surface properties of catalysts. The adsorption of volatile amines including, but not limited to, ammonia ($NH_3$), pyridine ($C_5H_5N$), n-butylamine ($CH_3CH_2CH_2CH_2NH_2$), quinoline ($C_9H_7N$) and the like is often used to determine the acid site concentration of solid catalysts. The amount of the base remaining on the surface after evacuation is considered chemisorbed and serves as a measure of the acid site concentration. The adsorbed base concentration as a function of evacuation temperature can give a site strength distribution. Similarly, the basic site concentration of solid catalysts may be investigated using $CO_2$ as the standard probe molecule. Another means of determining the site strength distribution is calorimetry or the temperature-programmed desorption (TPD). Ammonia TPD ($NH_3$-TPD) and $CO_2$-TPD experiments are used to determine the total acidity and basicity of the catalyst, respectively. TPD can further give an idea about metal-support interactions by modeling $NH_3$ and $CO_2$ desorption kinetics and be used to determine the strength of acid and basic sites available on the catalyst surface.

In one embodiment, the acidity of the NiMoS hydrodesulfurization catalyst of the present disclosure is quantified using temperature-programmed desorption (TPD), preferably ammonia TPD. In one embodiment, the NiMoS hydrodesulfurization catalyst has a total acidity in the range of 0.3-0.8 mmol of $NH_3$ per gram of catalyst, preferably 0.34-0.7 mmol of $NH_3$ per gram of catalyst, preferably 0.4-0.65 mmol of $NH_3$ per gram of catalyst, preferably 0.5-0.6 mmol of $NH_3$ per gram of catalyst when measured at a temperature of 150-500° C., 200-400° C., or 250-350° C. (see Table 2 of Example 9). In a related embodiment, the NiMoS hydrodesulfurization catalyst having SBA-15 as the support material has a total acidity that is 30-75% greater, preferably 40-65% greater, more preferably 45-50% greater than that of the NiMoS hydrodesulfurization catalyst having zirconium modified SBA-15 as the support material. In another related embodiment, the NiMoS hydrodesulfurization catalyst of the present disclosure has a total acidity that is 8-75% greater, preferably 15-50% greater, more preferably 25-40% greater than a substantially similar catalyst not formed by the single-step calcination and reduction method.

According to a second aspect, the present disclosure relates to a method for desulfurizing a hydrocarbon feedstock comprising a sulfur-containing compound. The method involves the steps of contacting the hydrocarbon feedstock with a NiMoS hydrodesulfurization catalyst in the presence of $H_2$ gas to convert at least a portion of the sulfur-containing compound into a mixture of $H_2S$ and a desulfurized product, and removing $H_2S$ from the mixture thereby forming a desulfurized hydrocarbon stream. The NiMoS hydrodesulfurization catalyst used herein may have similar properties as described for that in the first aspect, such as composition, surface area, pore size, pore volume, and/or some other property. The NiMoS hydrodesulfurization catalyst with similar properties may be formed using the aforementioned single-step calcination method by following previously specified reaction conditions, such as reagents, solvent, reaction time, calcination temperature and/or drying temperature.

Preferably, the NiMoS hydrodesulfurization catalyst used herein contains nickel sulfide and molybdenum sulfide disposed on a support material comprising a zirconium modified mesoporous silica with a Si:Zr weight ratio of 5:1 to 20:1, preferably 7:1 to 15:1, more preferably 9:1 to 12:1, or about 10:1. Alternatively, the NiMoS hydrodesulfurization catalyst used herein contains nickel sulfide and molybdenum sulfide disposed on a support material comprising mesoporous silica (e.g. SBA-15). Preferably, the NiMoS hydrodesulfurization catalyst used herein has a Mo content in a range of 8-20%, preferably 9-18%, preferably 10-16%, preferably 11-15%, preferably 12-14%, or about 13% by weight relative to a total weight of the NiMoS hydrodesulfurization catalyst. Preferably, the NiMoS hydrodesulfurization catalyst has a Ni content in a range of 0.8-8%, preferably 1-6%, preferably 1.5-5%, preferably 2-4%, preferably 2.5-3.5%, or about 3% by weight relative to a total weight of the NiMoS hydrodesulfurization catalyst. The NiMoS hydrodesulfurization catalyst may have a Mo:Ni weight ratio of 2:1 to 9:1, preferably 3:1 to 7:1, more preferably 4:1 to 5:1, or about 13:3. The NiMoS hydrodesulfurization catalyst used herein may have a BET surface area of 350-500 $m^2/g$, preferably 370-480 $m^2/g$, preferably 390-460 $m^2/g$, preferably 400-450 $m^2/g$, preferably 410-440 $m^2/g$, preferably 420-430 $m^2/g$. The NiMoS hydrodesulfurization catalyst used herein may have an average pore size of 3-7 nm, 4-6.5 nm, 4.5-6 nm, or 5-5.5 nm. The Ni/Mo hydrodesulfurization catalyst used herein may have a total pore volume of 0.52-0.9 $cm^3/g$, 0.54-0.8 $cm^3/g$, 0.56-0.7 $cm^3/g$, or 0.58-0.68 $cm^3/g$.

The hydrocarbon feedstock may be delivered from a hydrocarbon reservoir or directly from an offshore or an onshore well. For example, the hydrocarbon feedstock may be a crude oil that is produced from an oil well, particularly from a sour gas oil well. Alternatively, the hydrocarbon feedstock may be a gaseous stream that is supplied directly from an offshore or an onshore well, or a sulfur-containing liquid or gaseous stream, e.g. gaseous ethane, liquid gasoline, liquid naphtha, etc. in a refinery or a petrochemical plant that needs to be desulfurized.

The hydrocarbon feedstock including a sulfur-containing compound may also include various hydrocarbon compounds such as $C_{1-50}$ hydrocarbon compounds, preferably $C_{2-30}$ hydrocarbon compounds, preferably $C_{3-20}$ hydrocarbon compounds, depending on the origin of the hydrocarbon feedstock. In one embodiment, the hydrocarbon feedstock includes $C_{1-20}$ normal paraffins, e.g. $C_{1-20}$ alkanes, $C_{1-20}$ isoparaffins, $C_{1-20}$ cycloparaffins (i.e. naphthenes) or $C_{1-20}$ cycloparaffins having side chain alkyl groups, $C_{1-20}$ aromatics or $C_{1-20}$ aromatics with side chain alkyl groups.

Exemplary sulfur-containing compounds include, but are not limited to, $H_2S$, elemental sulfur, carbon disulfide, dimethyl disulfide, ethyl disulfide, propyl disulfide, isopropyl disulfide, butyl disulfide, tertiary butyl disulfide, thianaphthene, thiophene, secondary dibutyl disulfide, thiols, methyl mercaptan, phenyl mercaptan, cyclohexythiol, methyl sulfide, ethyl sulfide, propyl sulfide, isopropyl sulfide, butyl sulfide, secondary dibutyl sulfide, tertiary butyl sulfide, benzothiophene, dibenzothiophene, alkyl benzothiophene, alkyl dibenzothiophene, thiocyclohexane, and/or any combination thereof.

In one or more embodiments, the sulfur-containing compound is at least one selected from the group consisting of a sulfide, a disulfide, a thiophene, a benzothiophene, and a dibenzothiophene. In a preferred embodiment, the sulfur-containing compound is a dibenzothiophene compound. Exemplary dibenzothiophene compounds include, but are not limited to, dibenzothiophene, 4-methyldibenzothiophene, 4,6-dimethyldibenzothiophene, and 4,6-diethyldibenzothiophene. In at least one embodiment, the sulfur-containing compound is dibenzothiophene, 4,6-dimethyldibenzothiophene, or both.

In one or more embodiments, the sulfur-containing compound may be present in the hydrocarbon feedstock at a concentration of 0.01-10%, preferably at least 0.05%, at least 0.1%, at least 1%, at least 3%, at least 5%, at least 6%, at least 7%, at least 8%, at least 9% by weight, and no more than 10% by weight, relative to a total weight of the hydrocarbon feedstock. In a related embodiment, a concentration of the sulfur-containing compound in the hydrocarbon feedstock is no more than 50,000 ppm, preferably no more than 20,000 ppm, preferably no more than 10,000 ppm, preferably no more than 5,000 ppm, preferably no more than 4,000 ppm, preferably no more than 2,000 ppm. Alternatively, a concentration of sulfur-containing compound in the hydrocarbon feedstock may be in a range of 100 to 10,000 ppm, preferably 250 to 7,500 ppm, preferably 500 to 5,000 ppm, preferably 750 to 2,500 ppm, preferably 1,000 to 2,000 ppm.

The hydrocarbon feedstock may be contacted with the NiMoS hydrodesulfurization catalyst in the presence of $H_2$ gas under favorable reaction conditions to convert at least a portion of the sulfur-containing compound into a mixture of $H_2S$ and a desulfurized product. In a preferred embodiment, the hydrocarbon feedstock is contacted with the NiMoS hydrodesulfurization catalyst at a temperature in a range of 150 to 500° C., preferably 200-450° C., preferably 300-400° C., or about 350° C. for 0.1-10 hours, 0.5-8 hours, 1-6 hours, 2-5 hours, or 3-4 hours. In one or more embodiments, a pressure of the $H_2$ gas is in a range of 2 to 10 MPa, preferably 3 to 9 MPa, preferably 3.5-8 MPa, preferably 4-7 MPa, preferably 4.5-6 MPa, or about 5 MPa. A volumetric flow ratio of the $H_2$ gas to the hydrocarbon feedstock may vary depending on the type of sulfur-containing compound present in the hydrocarbon feedstock. In some embodiments, the volumetric flow ratio of the $H_2$ gas to the hydrocarbon feedstock is in a range of 100:1 to 1:100, 80:1 to 1:80, 50:1 to 1:50, 40:1 to 1:40, or 30:1 to 1:30.

The hydrocarbon feedstock may be in a liquid state or a gaseous state. In view of that, contacting the hydrocarbon feedstock with the NiMoS hydrodesulfurization catalyst may be different, depending on the state of the hydrocarbon feedstock, i.e. the liquid state or the gaseous state. In one embodiment, the hydrocarbon feedstock is in a liquid state or in a gaseous state and the hydrocarbon feedstock is passed through the NiMoS hydrodesulfurization catalyst via a fixed-bed or a fluidized-bed reactor. In another embodiment, the hydrocarbon feedstock is in a gaseous state and the hydrocarbon feedstock is passed over the NiMoS hydrodesulfurization catalyst, or may stay stagnant over the NiMoS hydrodesulfurization catalyst, i.e. as an atmosphere to the catalyst. Yet in another embodiment, the hydrocarbon feedstock is in a liquid state and the hydrocarbon feedstock is mixed with the NiMoS hydrodesulfurization catalyst to form a heterogeneous mixture in a batch reactor equipped with a rotary agitator.

In one embodiment, the contacting converts by weight 40-99.8%, preferably at least 45%, preferably at least 50%, preferably at least 55%, preferably at least 60%, preferably at least 65%, preferably at least 70%, preferably at least 75%, preferably at least 80%, preferably at least 85%, preferably at least 90%, preferably at least 95%, preferably at least 99% of the sulfur-containing compound present in the hydrocarbon feedstock into a mixture of $H_2S$ and a desulfurized product. The method disclosed herein may include removing the $H_2S$ from the mixture in the presence of an inert gas (e.g. nitrogen) stream to form a desulfurized hydrocarbon stream. "Removing", as used herein, may refer to any process of separating, at least one component from a mixture. Exemplary removing processes include, but are not limited to, distillation, absorption, adsorption, solvent extraction, stripping, and filtration and are well known to those skilled in the art. The removed $H_2S$ may be collected and further supplied to a sulfur manufacturing plant to produce sulfur-containing products.

In one or more embodiments, the sulfur content of the desulfurized hydrocarbon stream is by weight 40-99.8%, preferably at least 45%, preferably at least 50%, preferably at least 55%, preferably at least 60%, preferably at least 65%, preferably at least 70%, preferably at least 75%, preferably at least 80%, preferably at least 85%, preferably at least 90%, preferably at least 95%, preferably at least 99% by weight less than that of the hydrocarbon feedstock prior to the contacting.

It is worth noting that the presently disclosed NiMoS hydrodesulfurization catalyst that is made via the presently disclosed single-step calcination and reduction method demonstrates greater catalytic activity than a substantially similar catalyst having nickel and molybdenum sulfides each present in relative weight percentages substantially similar to those in the currently disclosed catalyst, which are prepared via a process involving two or more calcination steps performed at a temperature at 300° C. or above (e.g. catalysts prepared by method (1) described in Example 2). In one embodiment, the sulfur content of the desulfurized hydrocarbon stream of a desulfurization process catalyzed by the NiMoS hydrodesulfurization catalyst is at least 40% by weight less than that of a desulfurization process catalyzed by a substantially similar catalyst under substantially identical conditions (e.g. temperature, pressure, time), preferably at least 50%, preferably at least 60%, preferably at least 70%, preferably at least 75%, preferably at least 80% by weight less than that of a desulfurization process catalyzed by a substantially similar catalyst under substantially identical conditions (see Table 3 of Example 13).

The examples below are intended to further illustrate protocols for preparing, characterizing the NiMoS hydrodesulfurization catalysts, and uses thereof, and are not intended to limit the scope of the claims.

Example 1

Reagents and Chemicals

Tetraethylorthosilicate (TEOS) (99%), pluronic P123 $PEO_{20}$-$PPO_{70}$-$PEO_{20}$ triblock copolymer, nickel nitrate hexahydrate (99%), zirconium(IV) isopropoxide (70 wt. % in 1-propanol) used as silica source, structural directing agent, nickel and zirconium sources, respectively, were purchased from Sigma-Aldrich. Ammonium molybdate(VI) tetrahydrate (99%) from ACROS was used as molybdenum source. Analytical de-ionized (DI) $H_2O$ used for synthesis and preparation was produced in-house by Thermo Scientific Barnstead NANOPURE after distillation with a Labstrong FiSTREEM™ II 2S Glass Still distiller.

Example 2

Synthesis of NiMo Supported SBA-15 and Zr-SBA-15

HDS NiMo supported (Zr)SBA-15 catalysts were synthesized via two different methods: method (1) by direct incorporation of Mo with or without Zr into hexagonal framework of SBA-15, followed by impregnation of Ni in the final step after calcination of (Zr)-SBA-15-Mo, or method (2) by impregnation of Ni without calcination of (Zr)-SBA-15-Mo.

For method (1): (Zr)SBA-15-Mo/Ni, the synthesis procedures required dissolution of surfactant (2 g P123) in 60 g of (2M) HCl and 15 g of de-ionized water at 40° C., followed by addition of TEOS (4.2 g) or simultaneous addition of TEOS (4.2 g) and Zr-isopropoxide to a continuous stirring mixture, and mixed together for 16 h. Ammonium molybdate(VI) tetrahydrate was added to above mixture and allowed to stir for additional 3 h, before being transferred into a stainless steel autoclave for hydrothermal operation at 80° C. for 24 h. The solid obtained was centrifuged and dried for 12 h at 100° C., followed by calcination at 300° C. for 6 h. The nickel was introduced via excess solution impregnation, and the solution was allowed to dry gradually at 60° C. for 6 h. The final solid sample was further dried at 110° C. for 12 h without further calcination prior to sulfidation. The catalysts prepared were denoted as "SMN" and "ZrSMN" for the first synthesis approach.

For method (2): (Zr)SBA-15-Mo—Ni, the synthesis strategy was similar to the above except that the introduction of nickel was done without prior calcination of Zr(SBA)-15-Mo after drying for 12 h and no calcination was done prior to reduction and sulfidation step. The catalysts prepared were denoted as "SMN-R" and "ZrSMN-R" for one-step calcination and reduction approach.

Example 3

Characterization of HDS Catalysts

Catalysts in oxide and sulfided-form were characterized by different techniques. $N_2$-physisorption, X-ray diffraction (XRD), Raman, pyridine Fourier transform infrared (Pyr-FTIR), diffusion reflectance spectroscopy (DRS), X-ray fluorescence (XRF), X-ray photoelectron spectroscopy (XPS), temperature programmed desorption (TPD) and reduction (TPR), scanning electron microscope (SEM), and HRTEM.

The porosity and specific surface area analysis of catalysts were determined by Micromeritics ASAP 2020 unit. Samples were degassed prior to analysis under vacuum to remove the physisorbed moisture and impurities at 250° C. for 180 minutes. The crystallinity of active phase was examined by wide angle X-ray diffraction (Rigaku XRD Miniflex using CuKα radiation ($\lambda$=1.5406 Å) at 3° C./min scan rate of 0.03 width. The laser Raman spectroscopy (LRS) was performed by HORIBA, iHR320 with CCD detector at 532 nm (300 mW) to support the crystallinity and/or dispersion of the catalysts observed from XRD. LRS was also used to observe the mode of vibrations due to interactions between the support and active species of catalysts prepared by different methods. The type of acidity with respect to Lewis and Bronsted was determined by FTIR spectroscopy absorption of pyridine on self-supported wafer placed in Specac cell adapted to Thermo-Scientific Nicolet 6700 spectrometer. The samples were pretreated under vacuum ($1.33 \times 10^{-3}$ Pa) at 350° C. for 1 h, followed by adsorption of pyridine vapor at 150° C. for 30 min. The weakly bonded pyridine was evacuated for 15 min prior to acidity measurement and the spectra were recorded after degassing at 200° C. to measure total acidity due to Lewis and Bronsted acid sites.

Surface acidity characteristics of the catalysts was performed by temperature programmed desorption (TPD) on a Micromeritics Chemisorb 2750, using 10 wt % $NH_3$ diluted in He as a probe molecule. Approximately 100 mg of sample was treated in constant flow of Helium at 600° C. for half-hour, followed by cooling to 100° C. before adsorbing diluted $NH_3$ (10%-$NH_3$/He) on the catalyst at 25 mL/min for 30 mins. Prior to desorption experiment, the physically adsorbed $NH_3$ was removed by purging the quartz tube containing the catalyst with He for 60 mins. The system was heated to 1000° C. at 10° C./min, with the thermogram recorded on a thermal conductivity detector (TCD) using TPx software for data analysis.

The elemental composition of the bulk catalysts was determined and calculated by SPECTRO XEPOS energy dispersive X-ray fluorescence (ED-XRF) spectrometer (AMETEK, Materials analysis division) equipped with AMECARE M2M. Morphology of catalysts with respect to methods of preparation was examined on scanning electron microscope (SEM) (TESCAN LYRA 3, Czech Republic), equipped with an energy-dispersive X-ray spectrometer (EDS, Oxford, Inc.) detector for elemental analysis. The SEM was operated at an accelerating voltage of 30 kV, using secondary electron (SE) and backscattered electron (BSE) modes.

Example 4

Reduction and Sulfidation of NiMo-Oxide Catalysts

Oxide phase HDS catalyst was transformed to active sulfided NiMo phase by treatment with 2 wt % $CS_2$ in cyclohexane at 350° C. for 4 h. Prior to this step, pelletized catalyst (300-500 microns) was reduced in a stream of 10% $H_2$/Ar mixture at 50 mL/min for 150 min at 400° C. and then cooled to 350° C. for deposition of sulfur on reduced metal centers for (Zr)SMN. Whilst for (Zr)SMN-R catalysts, calcination and reduction are combined in a single step before sulfidation as described above.

Example 5

Catalysts Evaluation

The HDS catalytic activity of sulfided catalysts was evaluated in a commercial diesel spiked with 1000 ppm-S of DBT and DMDBT at 350° C. and 5 MPa using Parr batch reactor (Parr 4576B). About 300 mg of sulfided catalyst was mixed with 100 mL of diesel containing the sulfur additives at the concentration described above, and stirred at 300 rpm continuously for 4 h. Aliquots were taken at 1 h interval after the process conditions were achieved and analyzed by gas chromatograph sulfur chemiluminiscence detector (GC-SCD) and mass spectrometer (GC-MS) for sulfur content and product distribution, respectively.

Example 6

$N_2$ Physisorption of the Catalysts

Textural properties such as surface area, pore size, and pore volume of HDS sulfided catalysts measured by $N_2$ physisorption are presented in Table 1. The data of physisorption properties of the catalysts synthesized by one step reduction strategy showed a higher specific surface area (BET method) and total pore volume (BJH method) than those of catalysts prepared via the sequential calcination and reduction approach. However, the average pore diameter of SMN and ZrSMN prepared from the sequential calcination and reduction approach was higher than that of SMN-R and ZrSMN-R, respectively.

Noticeably, the SMN-R surface area was increased approximately by ca.26% compared to SMN, while the total pore volume was increased by ca. 14%. Similarly, the surface area and total pore volume of catalyst ZrSMN-R were increased by ca. 37% and 23%, respectively, compared to ZrSMN. It is worth mentioning that the textural properties obtained for catalysts without Zr-incorporation (SMN and SMN-R) were higher than corresponding catalysts with Zr addition (ZrSMN and ZrSMN-R) due to additional pores and surface blockage by zirconium particles introduced into the catalyst matrix. As shown in FIG. 1A, the isotherm obtained for the catalysts is Type IV with H1 hysteresis loop which was characteristic of a narrow range of uniform mesopores [M. Thommes, K. Kaneko, A. V. Neimark, J. P. Olivier, F. Rodriguez-Reinoso, J. Rouquerol, K. S. W. Sing, Physisorption of gases, with special reference to the evaluation of surface area and pore size distribution (IUPAC Technical Report), Pure and Applied Chemistry, 87 (2015) 1051-1069]. In addition, the existence of plugged nanoparticles within the mesopores of SBA-15 as observed from two-step desorption was due to incorporation of metal species. The first desorption step was attributed to SBA-15, while the second desorption step was due to nanoparticles of NiMoS species and zirconium. The one-step approach preserved a larger surface area that would be of great benefit for HDS catalytic activity than conventional calcination and reduction strategy.

TABLE 1

Summary of textural properties and pyridine FTIR analysis

| Catalyst | BET Surface Area ($m^2$/g) | Total Pore Volume ($cm^3$/g) | Micropore Area ($m^2$/g) | Average Pore Size (nm) | L (μmol/g) | B (μmol/g) | B/L |
|---|---|---|---|---|---|---|---|
| SMN | 338 | 0.51 | 0.034 | 7.1 | 252 | 88 | 0.35 |
| ZrSMN | 284 | 0.47 | 0.025 | 7.3 | 261 | 80 | 0.31 |
| SMN-R | 425 | 0.58 | 0.024 | 6.1 | 284 | 110 | 0.39 |
| ZrSMN-R | 390 | 0.58 | 0.024 | 6.4 | 227 | 122 | 0.54 |

Example 7

X-Ray Diffraction (XRD) Analysis

The crystallinity and dispersion analysis of NiMo HDS catalysts in oxide and sulfided form was examined by wide-angle XRD as a function of different synthesis and heat treatment approaches. Similar to titanium, Zr atoms are capable of incorporating into the silica framework of mesoporous SBA-15 and aiding the dispersion of HDS active phase [A. Tuel, Modification of mesoporous silicas by incorporation of heteroelements in the framework, Microporous and mesoporous materials, 27 (1999) 151-169, incorporated herein by reference in its entirety]. Pure orthorhombic molybdena ($MoO_3$) crystalline X-ray diffractogram consists of major peaks at 2θ 13, 23.42, 26, 27.52, and 39° corresponding to 020, 110, 040, 021, and 060, respectively, and can be indexed to JCPSD 05-0508 [S. Badoga, R. V. Sharma, A. K. Dalai, J. Adjaye, Hydrotreating of heavy gas oil on mesoporous zirconia supported NiMo catalyst with EDTA, Fuel, 128 (2014) 30-38, incorporated herein by reference in its entirety]. In addition, the degree of dispersion deposition of $MoO_3$ with respect to promoter effect on heteroatoms modified mesoporous silica can be evaluated by reduction in peak intensity of $MoO_3$ main phases and/or prevention of $NiMo_4$ crystalline for supported HDS catalysts.

Figure 2A:
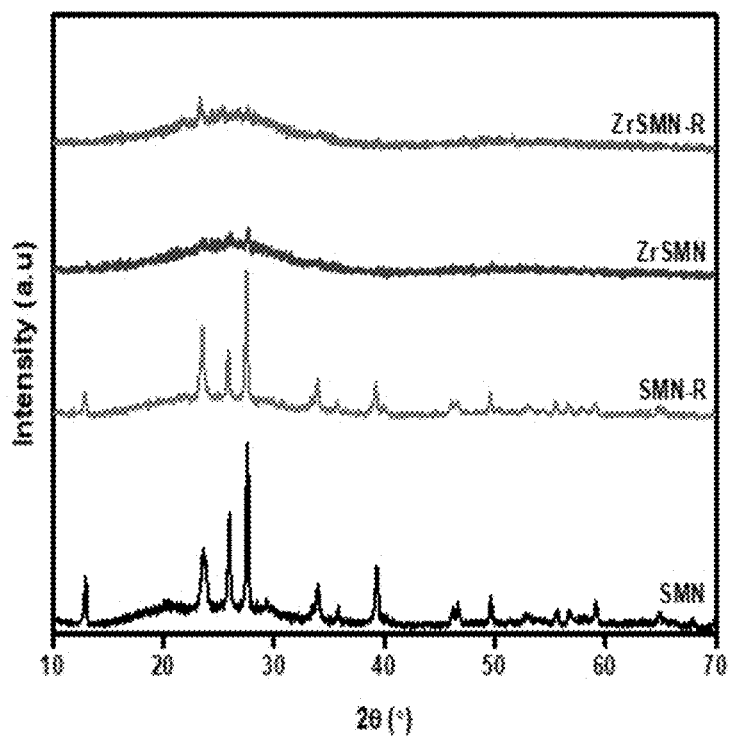
FIG. 2A is an overlay of X-ray diffraction (XRD) patterns of catalysts SMN, ZrSMN, SMN-R, and ZrSMN-R, respectively, measured prior to the sulfiding step.

As shown in FIGS. 2A and B, the observed diffractograms of the catalysts prepared with the addition of Zr present highly dispersed phase with reflection corresponding to mesoporous silica on wide angle XRD. This observation is an indication of dispersion in supported metal-oxides with little or no peaks corresponding to metal-oxides deposited [S. A. Ganiyu, S. A. Ali, K. Alhooshani, Synthesis of a Ti-SBA-15-NiMo Hydrodesulfurization Catalyst: The Effect of the Hydrothermal Synthesis Temperature of NiMo and Molybdenum Loading on the Catalytic Activity, Industrial & Engineering Chemistry Research, 56 (2017) 5201-5209, incorporated herein by reference in its entirety]. Conversely, the catalysts without Zr in oxide form show the corresponding phases that can be indexed to orthorhombic $MoO_3$ phases with card no. (JCPSD 05-0508), and the catalyst SMN-R prepared by one-step reduction approach showed slightly better dispersion than SMN catalyst.

Figure 2B:
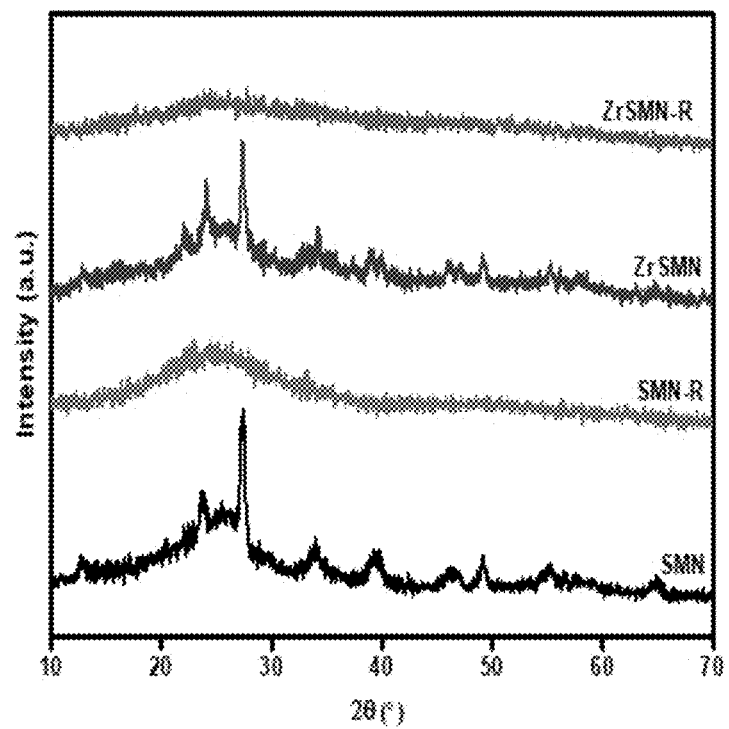
FIG. 2B is an overlay of XRD patterns of NiMoS catalysts SMN, ZrSMN, SMN-R, and ZrSMN-R, respectively.

As shown in FIG. 2B, the sulfided diffractograms of catalysts give further insight into the degree of sulfidation. Both catalysts (SMN-R and ZrSMN-R) prepared by one step heat treatment strategy showed high degrees of sulfidation and dispersion of active species due to disappearance of peaks corresponding to $MoO_3$. Conversely, the catalysts prepared by the sequential calcination and reduction approach showed phases associated with molybdena after sulfidation, and this confirmed that there were some unconverted molybdenum-oxide species during sulfidation. Therefore, compared with those prepared by multiple heat treatments, catalysts made via one-step calcination and reduction strategy possessed more highly dispersed active phases necessary for HDS reaction.

Example 8

Raman Analysis

Figure 3A:
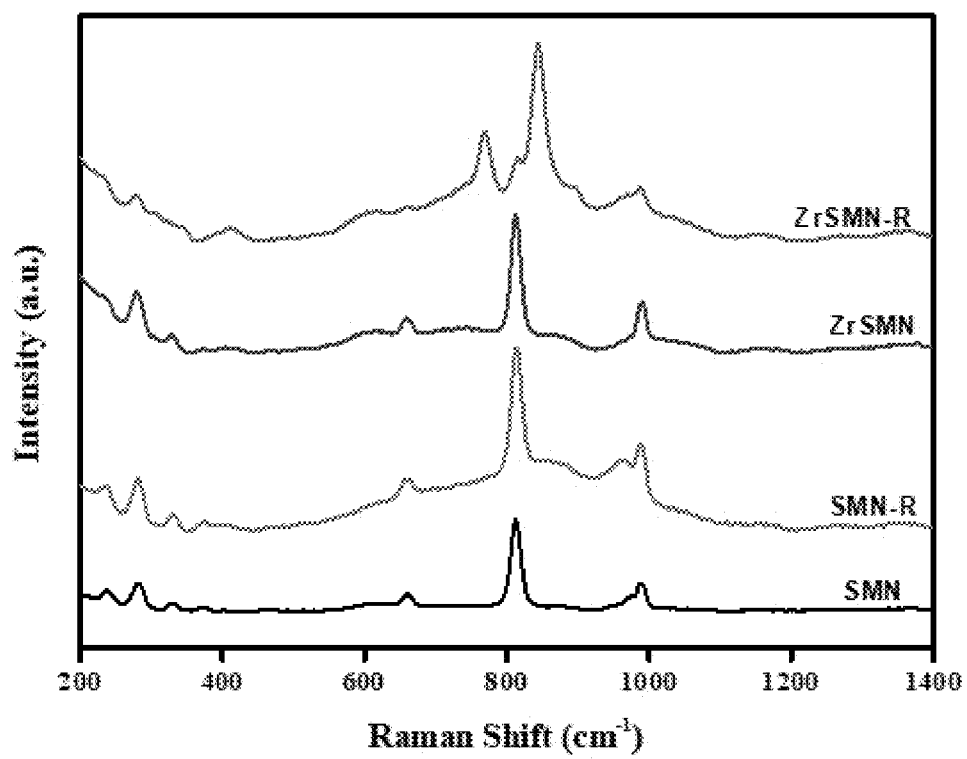
FIG. 3A is an overlay of Raman spectra of catalysts SMN, ZrSMN, SMN-R, and ZrSMN-R, respectively, measured prior to the sulfiding step.
Figure 3B:
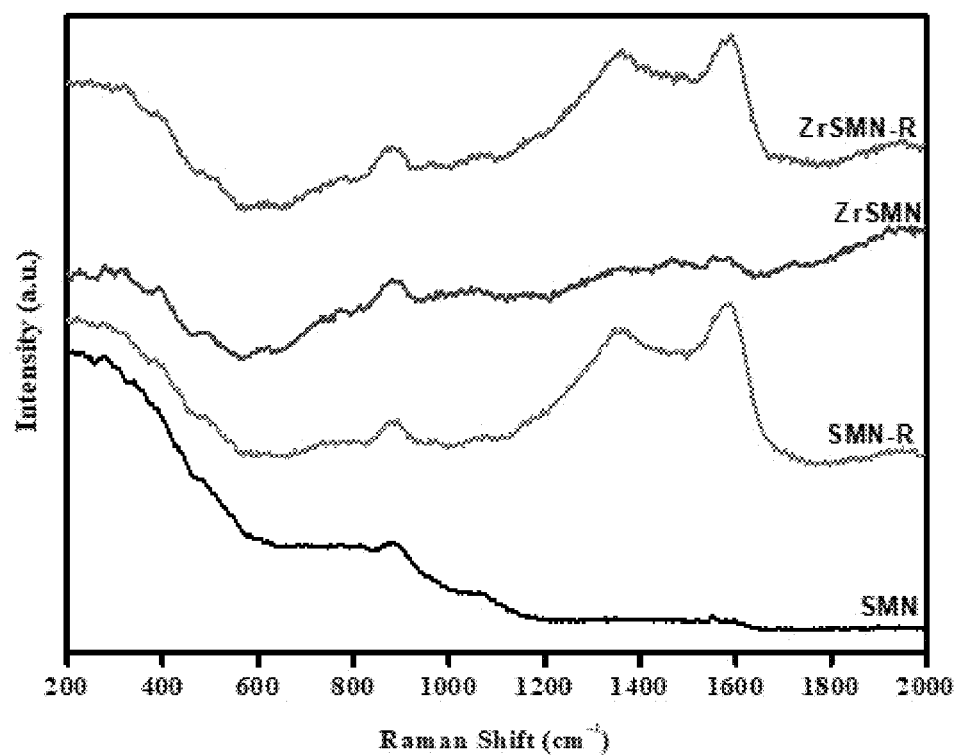
FIG. 3B is an overlay of Raman spectra of NiMoS catalysts SMN, ZrSMN, SMN-R, and ZrSMN-R, respectively.

In addition to mode of vibrations, the dispersion and crystallinity of metal oxide supported catalysts could be observed by Laser Raman spectroscopy (LRS) as a complimentary technique to XRD. The vibrational modes of $MoO_3$ crystalline particles associated with symmetric stretching of M=O can be observed at 994 $cm^{-1}$, while stretching mode of Mo—O—Mo is at 819 and 665 $cm^{-1}$. Additionally, the terminal Mo=O at 290-280 $cm^{-1}$ corresponds to wagging mode of vibrations, and the characteristics bending and deformation modes of vibrations of O=Mo=O and O—Mo—O can be assigned to the bands observed at 336 and 375 $cm^{-1}$, respectively. As shown in FIGS. 3A and B, the modes of vibrations as described above were observed in oxide form of all catalysts. However, the peaks did not appear as sharp and intense as those of complete crystalline $MoO_3$ phases [M. Dieterle, G. Weinberg, G. Mestl, Raman spectroscopy of molybdenum oxides Part I. Structural characterization of oxygen defects in $MoO_{3-x}$ by DR UV/VIS, Raman spectroscopy and X-ray diffraction, Physical Chemistry Chemical Physics, 4 (2002) 812-821, incorporated herein by reference in its entirety]. This suggested some degree of interaction and dispersion of the active species on the support. The appearance of peaks at 970 and 355 $cm^{-1}$ indicated the dominant molybdena species interaction with SBA-15 in form of tetrahedral $(Si—O—)_2Mo(=O)_2$ di-oxo species [K. Amakawa, R. Schlogl, R. Schomäcker, C. Limberg, Active site for propene metathesis in silica-supported molybdenum oxide catalysts, (2013), incorporated herein by reference in its entirety]. However, a larger degree of sulfidation was achieved by one step reduction strategy either with or without Zr, as observed in sulfided HDS catalysts (FIG. 3B). This observation agrees with the XRD analysis explained vide-supra.

Example 9

Temperature Programmed Desorption (TPD)

Figure 4:
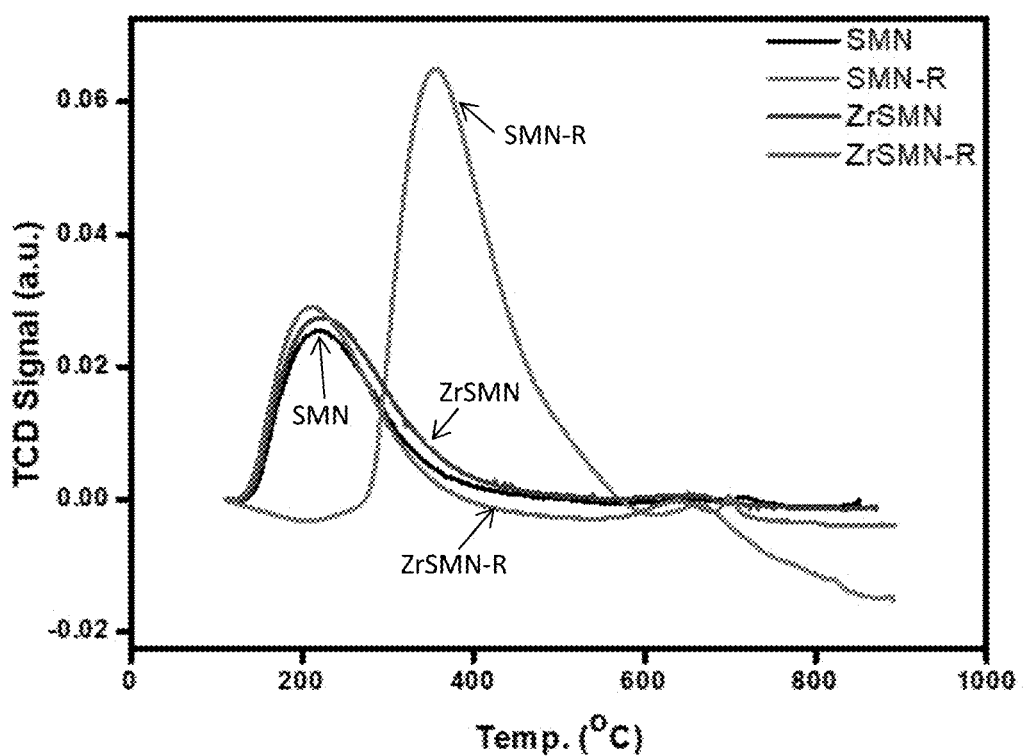
FIG. 4 is an overlay of temperature programmed desorption (TPD) by $NH_3$ profiles of catalysts SMN, ZrSMN, SMN-R, and ZrSMN-R, respectively, measured prior to the sulfiding step.

Correlation between dispersion, support metal interaction, and number of active of species of the HDS catalysts can be obtained from temperature programmed desorption analysis using $NH_3$ as a basic adsorbate. The nature of the acidity and the interaction of the catalysts' active species on the support associated with the desorption of $NH_3$ can be categorized according to different temperatures as weak (<200° C.), medium (200-350° C.) and strong (>350° C.) acidic centers [S. Badoga, A. K. Dalai, J. Adjaye, Y. Hu, Combined effects of EDTA and heteroatoms (Ti, Zr, and Al) on catalytic activity of SBA-15 supported NiMo catalyst for hydrotreating of heavy gas oil, Industrial & Engineering Chemistry Research, 53 (2014) 2137-2156]. Table 2 shows that catalysts possessed medium to strong acidity at different desorption temperatures. The medium acidity was observed between 210-221° C. for all catalysts except SMN-R, which was characterized by two desorption peaks at 358 and 668° C. as shown in FIG. 4. Interestingly, the incorporation of Zr into SBA-15 increased the surface acidity of the ZrSMN catalyst compared to SMN when the conventional calcination and reduction was adopted. This observation is in good agreement with previous studies [P. Biswas, P. Narayanasarma, C. M. Kotikalapudi, A. K. Dalai, J. Adjaye, Characterization and activity of $ZrO_2$ doped SBA-15 supported NiMo catalysts for HDS and HDN of bitumen derived heavy gas oil, Industrial & Engineering Chemistry Research, 50 (2011) 7882-7895]. However, one step reduction approach showed different results as SMN-R catalyst exhibited a slightly stronger acidity, and the total amount of surface acidity was higher than other catalysts in the series. Overall, the total surface acidities for SMN-R and ZrSMN-R were higher than corresponding SMN and ZrSMN. This indicated that the number of active species available and the dispersion in catalysts made by one step reduction approach was higher than the corresponding catalysts prepared by conventional sequential calcination and reduction method. This observation was supported by XRD, Raman and $N_2$ physisorption showing the presence of high surface area, and small crystallites of active species.

TABLE 2

Temperature programmed desorption by ammonia

| | TPD; $NH_3$ desorbed | | | | |
|---|---|---|---|---|---|
| Catalysts | Peak Temperature (200-350° C.) | Amount (mmol/g) | Peak Temperature (>350° C.) | Amount (mmol/g) | Total (mmol/g) |
| SMN | 219 | 0.263 | 667 | 0.004 | 0.267 |
| ZrSMN | 221 | 0.306 | 658 | 0.004 | 0.310 |
| SMN-R | 357 | 0.593 | 668 | 0.019 | 0.612 |
| ZrSMN-R | 210 | 0.321 | 699 | 0.017 | 0.338 |

Example 10

FTIR Pyridine

In order to further investigate the surface acidity of the catalysts, the types of acidity were determined by pyridine adsorption using spectroscopic method. The interaction of pyridine (strong base) with Lewis and Bronsted acidic centers can be measured by FTIR using pyridinium ion peak assignments.

Figure 5:
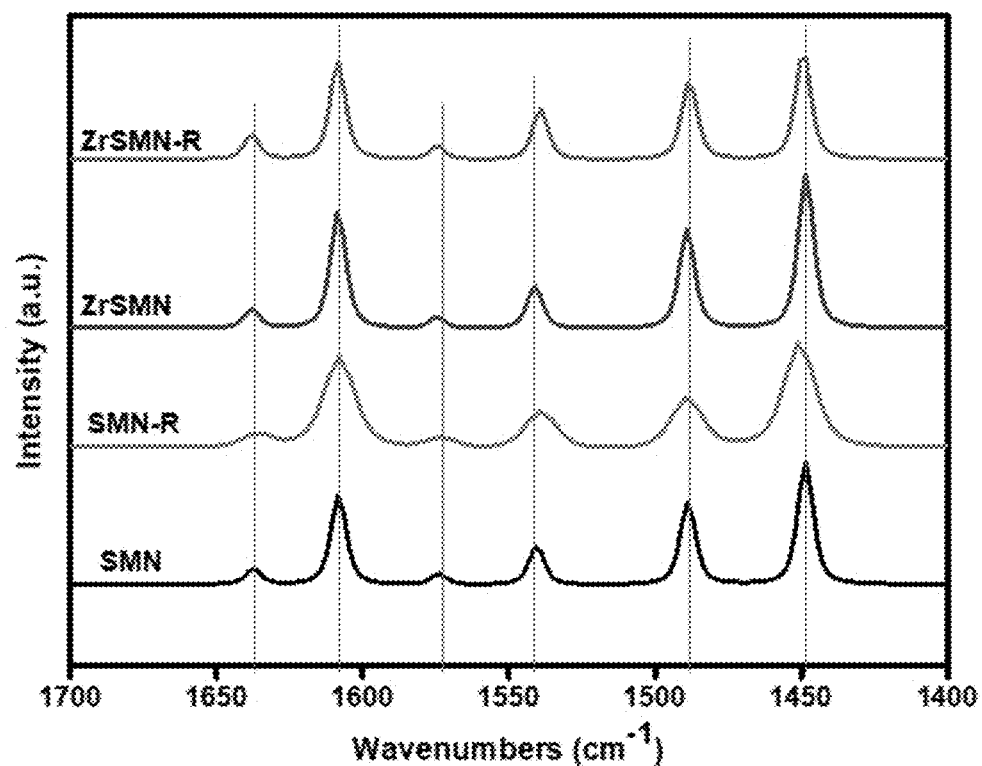
FIG. 5 is an overlay of FTIR pyridine adsorption profiles of catalysts SMN, ZrSMN, SMN-R, and ZrSMN-R, respectively, measured prior to the sulfiding step.

Lewis acid sites generally occur due to coordinatively unsaturated cations exposed on the surface of ionic metal-oxide, while the Bronsted sites are largely due to surface OH arising from adsorbed water on the surface of metal oxides [G. Busca, Spectroscopic characterization of the acid properties of metal oxide catalysts, Catalysis today, 41 (1998) 191-206]. The Lewis acid gives rise to strong and weak acid sites at (1450 cm$^{-1}$ and 1610 cm$^{-1}$) and (575 cm$^{-1}$), respectively, while Bronsted acids peaks are found at 1542 cm$^{-1}$ and 1640 cm$^{-1}$. In addition, there is an overlap of Lewis and Bronsted acid peaks centering at 1492 cm$^{-1}$ [L. Ding, Z. Zhang, Y. Zheng, Z. Ring, J. Chen, Effect of fluorine and boron modification on the HDS, HDN and HDA activity of hydrotreating catalysts, Applied Catalysis A: General, 301 (2006) 241-250]. The quantitative amount and peak assignment of Lewis and Bronsted sites for each catalyst made by different methods of preparation are presented in Table 1 and FIG. 5, respectively. It has been shown that the catalyst subjected to multiple heat treatments and calcination provided much more Lewis acids than Bronsted acids, due to loss of adsorbed water in the catalyst to heat. The quantitative amount of Bronsted acid sites present in SMN-R and ZrSMN-R was greater than their corresponding SMN and ZrSMN. Furthermore, the total acidity due to Lewis and Bronsted acid sited possessed by SMN-R and ZrSMN-R was higher compared to their counterparts (SMN and ZrSMN). It was reported that the activity of HDS catalyst increased with increasing total acidity and/or Bronsted-Lewis ratios [D. Zhang, A. Duan, Z. Zhao, C. Xu, Synthesis, characterization, and catalytic performance of NiMo catalysts supported on hierarchically porous Beta-KIT-6 material in the hydrodesulfurization of dibenzothiophene, Journal of Catalysis, 274 (2010) 273-286].

Example 11

UV-Vis Diffusion Reflectance Spectroscopy (UV-Vis DRS)

Figure 6:
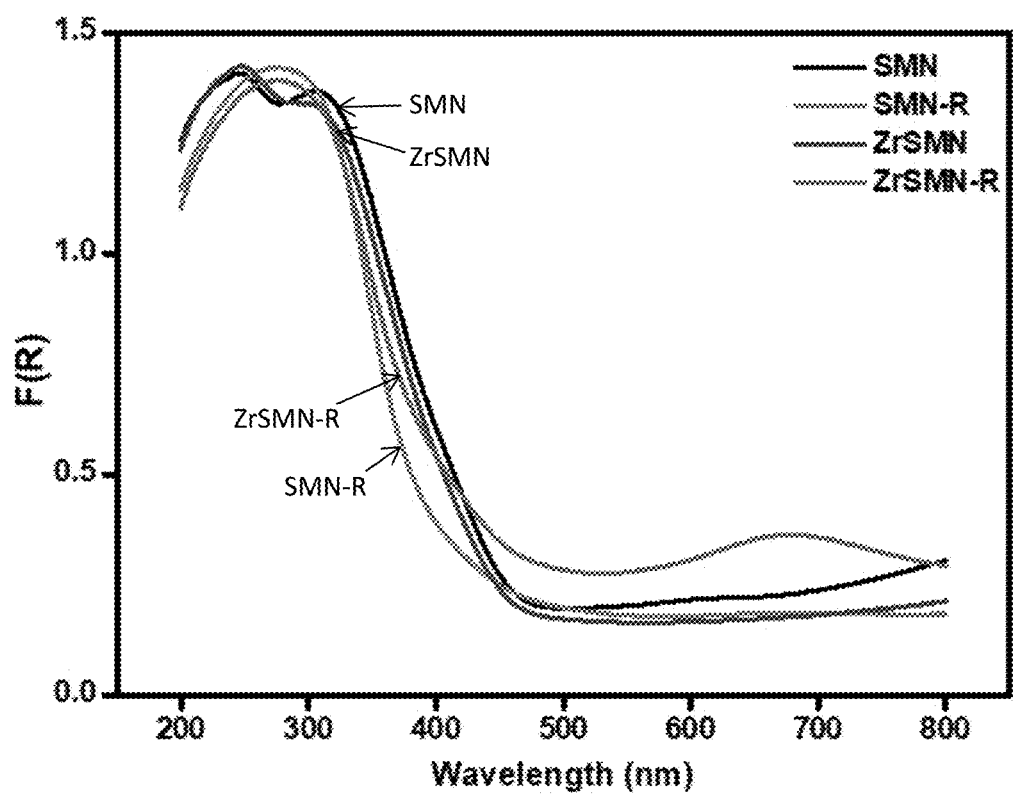
FIG. 6 is an overlay of UV-vis diffusion reflectance spectra (DRS) of NiMoS catalysts SMN, ZrSMN, SMN-R, and ZrSMN-R, respectively.
Figure 7A:
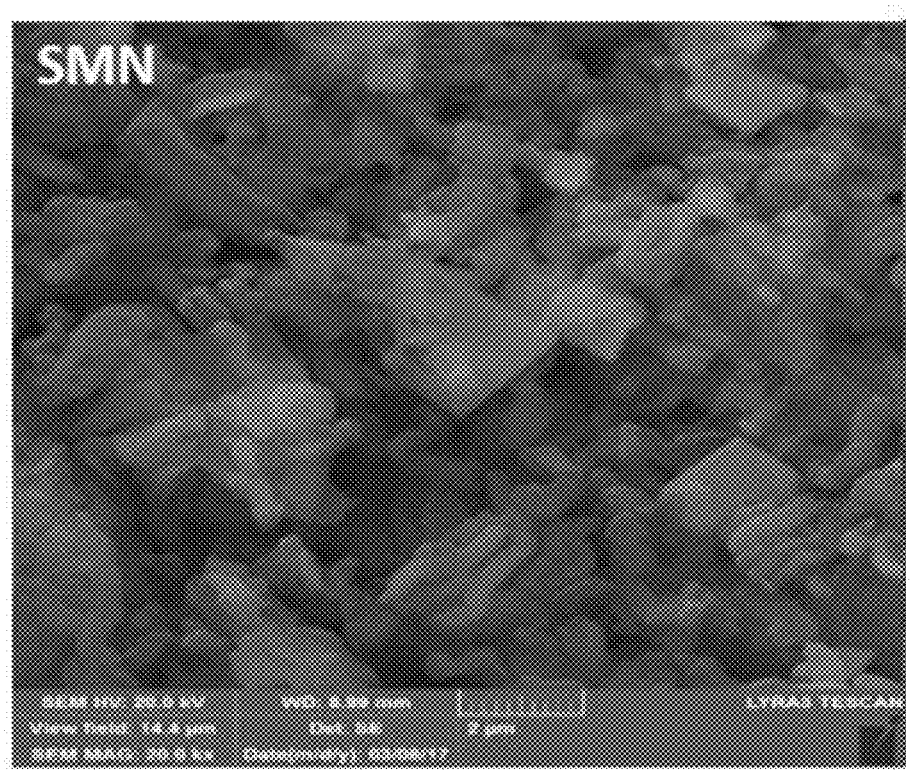
FIG. 7A is a scanning electron microscope (SEM) image of NiMoS catalyst SMN.
Figure 7B:
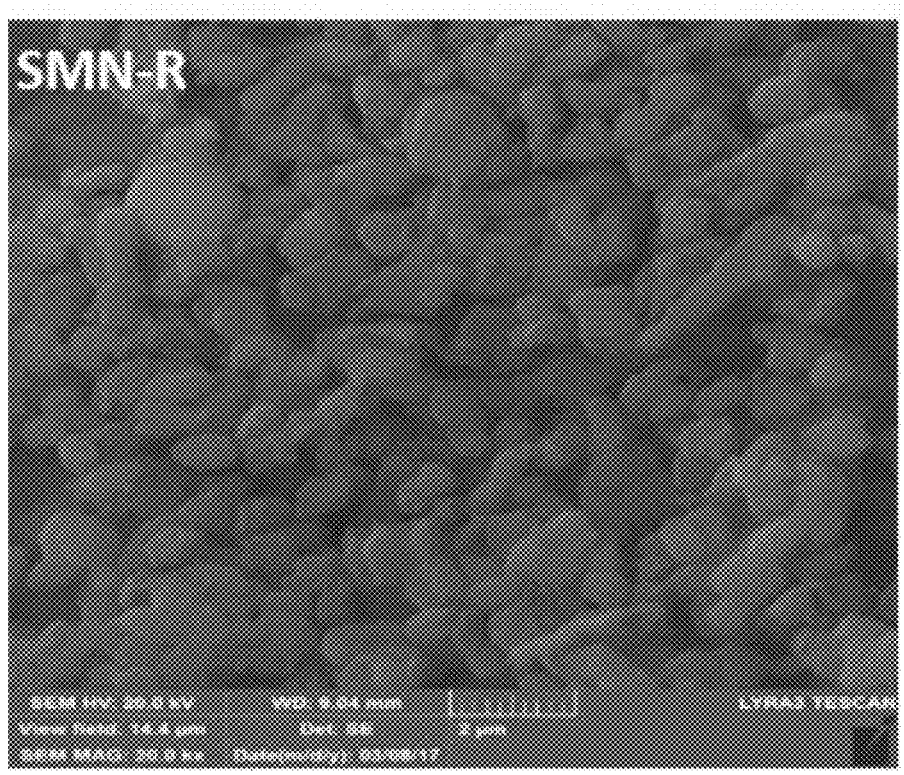
FIG. 7B is a SEM image of NiMoS catalyst SMN-R.
Figure 7C:
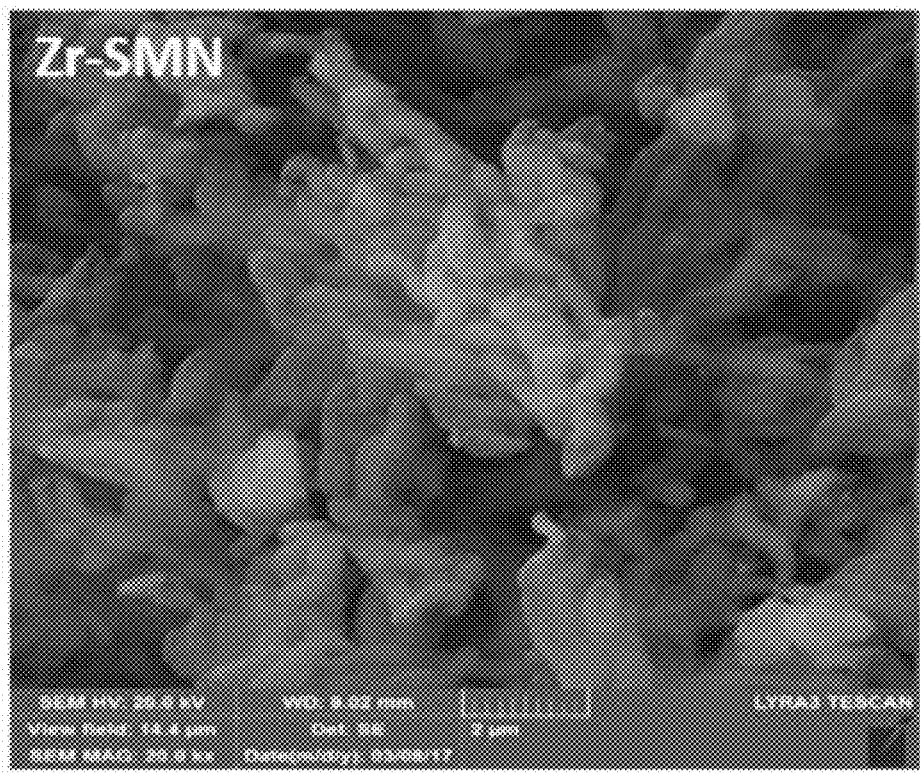
FIG. 7C is a SEM image of NiMoS catalyst Zr-SMN.
Figure 7D:
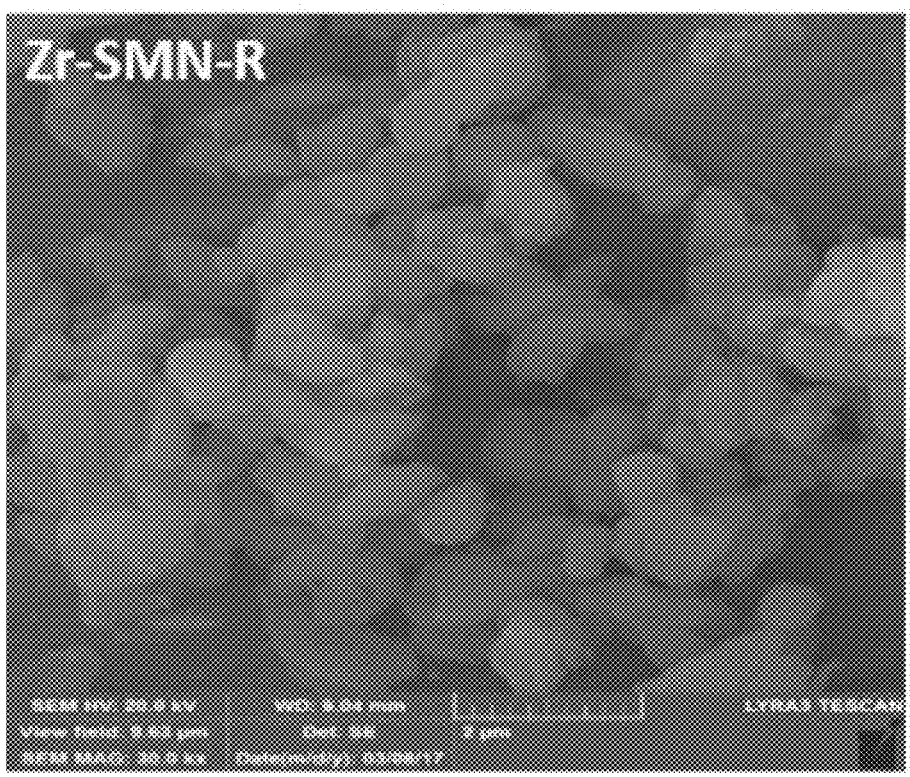
FIG. 7D is a SEM image of NiMoS catalyst Zr-SMN-R.

Absorption bands characteristic of the catalysts were observed in the range of 200-500 nm, which corresponded to Ligand-metal charge transfer (LMCT) assigned to $O^{2-}$–$Mo^{6+}$. The presence of isolated molybdate species could be ascribed to tetrahedral (Td) at absorption band of 250 nm and octahedral (Oh) coordination at absorption band at 280-330 nm [O. Y. Gutiérrez, D. Valencia, G. A. Fuentes, T. Klimova, Mo and NiMo catalysts supported on SBA-15 modified by grafted $ZrO_2$ species: Synthesis, characterization and evaluation in 4, 6-dimethyldibenzothiophene hydrodesulfurization, Journal of Catalysis, 249 (2007) 140-153]. It has been established that the position of these bands could be affected by the particle size of the metal-oxides, which might be blue or red shifted [R. S. Weber, Effect of local structure on the UV-visible absorption edges of molybdenum oxide clusters and supported molybdenum oxides, Journal of Catalysis, 151 (1995) 470-474]. As shown in FIG. 6, the DRS absorption spectra for SMN and ZrSMN exhibited similar bands characterized by the mixture of molybdates in Td and Oh symmetry at about 250 nm and 310 nm, respectively, while the observed absorption spectra for SMN-R and ZrSMN-R was characterized by single Oh peak at 280 nm. The presence of single absorption band indicated a well dispersed homogenous active species as compared to two bands for catalysts prepared by conventional calcination and reduction in a sequential way. Therefore, the degree and coordination of Mo composition in a supported HDS catalyst with respect to dispersion depends on the method of thermal treatment of the catalyst before sulfidation.

Example 12

Scanning Electron Microscope (SEM) Analysis

Morphology of a supported catalyst depends on its method of preparation. Mostly, undistorted morphology of SBA-15 or modified-SBA-15 is sphere, fibers, or rods [V. Meynen, P. Cool, E. F. Vansant, Synthesis of siliceous materials with micro- and mesoporosity, Microporous and mesoporous materials, 104 (2007) 26-38]. FIGS. 7A-D demonstrate the morphology of the catalysts with variations in their morphologies with respect to effect of heat treatment and calcination, and addition of heteroatoms. Similar to pure SBA-15, catalysts SMN and ZrSMN exhibited short rod-like morphology. However, there was an observable growth of nano-cubical flat-sheet morphology alongside with the regular morphology attributed to SBA-15 in catalyst SMN, which was related to Mo-oxide particles species as confirmed by EDX analysis (not shown), and as evidenced from XRD crystallinity peak explained vide-supra. The presence of cubic flat sheet was not observed in the catalyst ZrSMN, and this justified that the addition of heteroatoms (Zr) prevented the growth of large $MoO_3$ particles. Furthermore, the observed morphology of SMN-R and ZrSMN-R was slightly distorted and fully-grown rods or sphere was not observed due to absence of calcination after the synthesis and/or addition of active species in the direct synthesis approach. In addition, there was no observable growth of $MoO_3$ particles for either SMN-R or ZrSMN-R in the representative micrographs.

Example 13

Catalytic Activity Results

Catalytic activity of the catalysts was observed for simultaneous HDS of DBT and DMDBT in commercial diesel as a function of methods of preparation and addition of heteroatoms. The reaction was conducted in a batch reactor at 350° C. and 5 MPa using commercial diesel spiked with 1000 ppmw-S of DBT and DMDBT as a representative fuel, and the activity of the catalysts were monitored for 4 h. During the first hour, the conversion of DBT for all catalysts was more than 50%, and the conversion of DMDBT for each catalyst was between 37-52%. This observation can be explained in terms of steric hindrance of DMDBT in approaching catalyst's active sites compared to DBT, which is a relatively small molecule and thus has an easier access to the active sites of the catalyst. Furthermore, the conversion of DBT at the end of 4 h reaction time was remarkable (between 95.6 and 99%) for all the catalysts, while the conversion of DMDBT remained between 64-84%. Table 3 shows the equilibrium concentrations of sulfur in the diesel at each hour interval for DBT and DMDBT obtained from GC-SCD.

TABLE 3

Sulfur content analysis of different catalysts by GC-SCD

| Catalysts | Sulfur Content (ppmw) (DBT) | | | | Sulfur Content (ppmw) (DMDBT) | | | |
| --- | --- | --- | --- | --- | --- | --- | --- | --- |
| | 1 h | 2 h | 3 h | 4 h | 1 h | 2 h | 3 h | 4 h |
| SMN | 431 | 130 | 65 | 44 | 630 | 452 | 387 | 356 |
| ZrSMN | 395 | 167 | 77 | 36 | 591 | 418 | 335 | 269 |

TABLE 3-continued

Sulfur content analysis of different catalysts by GC-SCD

| Catalysts | Sulfur Content (ppmw) (DBT) | | | | Sulfur Content (ppmw) (DMDBT) | | | |
|---|---|---|---|---|---|---|---|---|
| | 1 h | 2 h | 3 h | 4 h | 1 h | 2 h | 3 h | 4 h |
| SMN-R | 243 | 120 | 29 | 10 | 498 | 389 | 246 | 176 |
| ZrSMN-R | 230 | 116 | 24 | 12 | 476 | 360 | 218 | 157 |

The catalysts' performance can be evaluated at 1 h reaction time interval for both organosulfur compounds (DBT and DMDBT). For DBT, the catalytic conversion under SMN and ZrSMN was 56.9 and 60.5%, while the conversion under SMN-R and ZrSMN-R was 75.5 and 77%, respectively. It was observed that the performance of catalysts prepared by addition of Zr was better than their corresponding catalysts without incorporation of Zr into SBA-15 framework. Furthermore, it is worth mentioning that the HDS efficiency of the catalysts made by the single-step calcination and sulfidation strategy was greater than that of the catalysts subjected to the sequential calcination and sulfidation approach.

The catalytic conversion of DMDBT at 1 h reaction time under SMN and ZrSMN was 37 and 41%, which was lower compared to 50.2 and 52.4% using SMN-R and ZrSMN-R, respectively. The influence of Zr-addition to SBA-15 and single-step heat treatment strategy was found to be remarkable compared to catalysts without Zr and with multiple heat treatments. The superiority of Zr-based modified SBA-15 NiMo catalysts can be explained by higher dispersion of Mo-species in octahedral form and the prevention of agglomeration of Mo-particles that might be resulted from poor dispersion due to amorphous nature of the silica support. Also, the loss of catalytic properties such as surface acidity/acid sites and textural properties occurred during multiple heat treatments was prevented using single step strategy, thus providing the catalysts with better catalytic performance as supported by different characterization techniques (BET, XRD, TPD and FTIR-pyridine). Overall, the order of catalyst performance is: ZrSMN-R>SMN-R>ZrSMN>SMN.

Example 14

A synthesis route involving one-pot incorporation and one-step calcination and reduction to prepare sulfided-NiMo catalysts supported on SBA-15 (un)modified with zirconium is disclosed. NiMoS HDS catalysts supported on SBA-15 unmodified and modified with zirconium were developed by adopting a single-step calcination and reduction strategy prior to sulfidation step, with a view to prevent loss of catalytic properties and achieve better activity with the aid of greater dispersion of active species.

NiMoS catalysts obtained showed HDS activity on DBT and DMDBT present in commercial diesel. Physical characteristics and catalytic activity of NiMoS catalysts were examined by $N_2$ physisorption, XRD, XPS, XRF, Raman, TGA, TPD and TPR, and DRS. The structure-activity relationship of these catalysts was analyzed and their HDS activity on DBT and DMDBT in diesel was compared with that of catalysts made by the sequential calcination and reduction approach. The single-step calcination and reduction strategy afforded catalysts with high specific surface area, surface acidity, and metal dispersion, and also minimized the formation of crystalline inactive species that were difficult to reduce and sulfide, as revealed by BET, XRD, TPD and pyridine adsorption, UV-Vis DRS and SEM characterization techniques. The catalytic efficiency of the catalysts by single-step calcination and reduction strategy is 9-16% and 11-13% higher than conventional heat treatment for HDS of DBT and DMDBT, respectively. This approach is promising in achieving ultra-deep HDS of organosulfur compounds in transportation fuel at a low cost as well as meeting the current stringent environmental policy.

The invention claimed is:

1. A single-step calcination and reduction method of producing a NiMoS hydrodesulfurization catalyst, the method comprising:
    mixing a silica source and an aqueous solution comprising a structural directing surfactant, an acid, and a molybdenum precursor to form a first mixture;
    hydrothermally treating the first mixture at a temperature in a range of from 50 to 120° C. to form a first dried mass;
    mixing a solution comprising a nickel precursor and the first dried mass to form a second mixture;
    drying the second mixture at a temperature in a range of from 40 to 90° C. to form a catalyst precursor;
    calcining the catalyst precursor in an atmosphere, comprising a reducing agent comprising $H_2$ at a temperature in a range of from more than 350 to 600° C. to concurrently reduce the nickel precursor and form a calcined and reduced catalyst; and
    sulfiding the calcined and reduced catalyst with a sulfide-containing solution thereby forming the NiMoS hydrodesulfurization catalyst,
    wherein the first dried mass, the second mixture, and the catalyst precursor are not calcined prior to the calcining and are not catalytically active species,
    wherein the NiMoS hydrodesulfurization catalyst has a BET surface area in a range of from 350 to 450 m²/g, and
    wherein the NiMoS hydrodesulfurization catalyst comprises nickel sulfide and molybdenum sulfide disposed on a support material comprising a mesoporous silica.

2. The method of claim 1, wherein the first mixture further comprises a zirconium source, and
    wherein the support material comprises a zirconium modified mesoporous silica.

3. The method of claim 2, wherein the zirconium source is zirconium(IV) isopropoxide.

4. The method of claim 2, wherein the support material has a Si:Zr weight ratio in a range of from 5:1 to 20:1.

5. The method of claim 1, wherein the calcining is performed at a temperature in a range of from greater than 400 to 600° C. for a time in a range of from 0.5 to 8 hours.

6. The method of claim 1, wherein the sulfiding is performed at a temperature in a range of from 250 to 500° C. for a time in a range of from 1 to 10 hours.

7. The method of claim 1, wherein the reducing agent is present in an amount in a range of from 5 to 20 vol. %, relative to a total volume of the atmosphere.

8. The method of claim 1, wherein the reducing agent consists of $H_2$.

9. The method of claim 1, wherein the sulfide-containing solution comprises $CS_2$.

10. The method of claim 1, wherein the silica source is tetraethoxysilane, and
wherein the structural directing surfactant is P123.

11. The method of claim 1, wherein the mesoporous silica is SBA-15.

12. The method of claim 1, wherein the NiMoS hydrodesulfurization catalyst has a Mo content in a range of from 8 to 20 wt. % and a Ni content in a range of from 1 to 6 wt. %, each relative to a total weight of the NiMoS hydrodesulfurization catalyst.

13. The method of claim 1, wherein the NiMoS hydrodesulfurization catalyst has a BET surface area in a range of from 370 to 450 $m^2/g$.

14. The method of claim 1, wherein the NiMoS hydrodesulfurization catalyst has a total pore volume in a range of from 0.52 to 0.8 $cm^3/g$, and an average pore size in a range of from 4 to 7 nm.

15. The method of claim 1, wherein the hydrothermally treating of the first mixture is at a temperature in a range of from 50 to under 80° C.

16. The method of claim 1, wherein the reducing agent is present in the atmosphere during the calcining in a range of from 5 to 20 vol. %, and
wherein the NiMoS hydrodesulfurization catalyst is substantially devoid of cubical sheet-shaped particles.

17. The method of claim 8, wherein the reducing agent is present in the atmosphere during the calcining in a range of from 5 to 20 vol. %.

18. The method of claim 1, wherein the NiMoS hydrodesulfurization catalyst has, relative to a total NiMoS hydrodesulfurization catalyst weight,
a Mo content in a range of from 10 to 16 wt. %, and
a Ni content in a range of from 1.5 to 5 wt. %.

19. The method of claim 1, wherein the NiMoS hydrodesulfurization catalyst has, relative to a total NiMoS hydrodesulfurization catalyst weight,
a Mo content in a range of from 12 to 14 wt. %, and
a Ni content in a range of from 2.5 to 3.5 wt. %,
wherein the NiMoS hydrodesulfurization catalyst has a BET surface area in a range of from 390 to 425 $m^2/g$, a micropore area in a range of from 0.024 to 0.034 $m^2/g$, and a total pore volume in a range of from 0.51 to 0.58 $cm^3/g$, and
wherein the NiMoS hydrodesulfurization catalyst has a temperature programmed desorption by ammonia amount in a range of from 0.263 to 0.593 mmol/g.

20. The method of claim 1, wherein the reducing agent is present in the atmosphere during the calcining in a range of from greater than 10 to 15 vol. %, and
wherein the reducing agent is passed through the second dried mass at a flow rate in a range of from 80 to 150 mL/min.

* * * * *